US012003921B2

(12) United States Patent
Bramsløw et al.

(10) Patent No.: US 12,003,921 B2
(45) Date of Patent: Jun. 4, 2024

(54) HEARING AID COMPRISING AN ITE-PART ADAPTED TO BE LOCATED IN AN EAR CANAL OF A USER

(71) Applicant: Oticon A/S, Smørum (DK)

(72) Inventors: Lars Bramsløw, Smørum (DK); Svend Oscar Petersen, Smørum (DK)

(73) Assignee: Oticon A/S, Smørum (DK)

( * ) Notice: Subject to any disclaimer, the term of this patent is extended or adjusted under 35 U.S.C. 154(b) by 148 days.

(21) Appl. No.: 17/862,992

(22) Filed: Jul. 12, 2022

(65) Prior Publication Data

US 2023/0027782 A1 Jan. 26, 2023

(30) Foreign Application Priority Data

Jul. 13, 2021 (EP) .................................... 21185216

(51) Int. Cl.
*H04R 25/00* (2006.01)

(52) U.S. Cl.
CPC ..... *H04R 25/505* (2013.01); *H04R 2225/025* (2013.01)

(58) Field of Classification Search
CPC .......... H04R 2225/025; H04R 2460/11; H04R 2460/15; H04R 25/356; H04R 25/505
(Continued)

(56) References Cited

U.S. PATENT DOCUMENTS

2015/0172815 A1 6/2015 Park et al.
2019/0132686 A1 * 5/2019 Kuriger ................ H04R 25/505
(Continued)

OTHER PUBLICATIONS

Search Report issued in European priority application No. 21185216.5 dated Jan. 4, 2022.
(Continued)

*Primary Examiner* — Phylesha Dabney
(74) *Attorney, Agent, or Firm* — Birch, Stewart, Kolasch & Birch, LLP

(57) ABSTRACT

A hearing aid comprises a) an ITE-part adapted for being located at or in an ear canal of the user, b) a forward path for processing sound from the environment of the user. The forward path comprises b1) at least one first input transducer providing at least one first electric input signal representing said sound as received at the respective at least one first microphone, said at least one first input transducer being located to allow picking up sound from the environment of the user, b2) an audio signal processor comprising a gain unit for applying a frequency and/or level dependent prescribed gain to compensate for a hearing impairment of the user to said at least one first electric input signal, or a signal or signals originating therefrom, and configured to provide a processed signal in dependence thereof, b3) an output transducer for providing stimuli perceivable as sound to the user in dependence of said processed signal. The hearing aid further comprises c) at least one second input transducer providing at least one second electric input signal representing said sound as received at the at least one second input transducer, the at least one second input transducer being located in said ITE-part to pick up sound at the eardrum of the user, d) a correlator configured to determine a correlation measure between the at least one second electric input signal, or a signal originating therefrom, and a signal of the forward path and e) a gain modifier configured to modify said gain of the gain unit in dependence of said correlation measure. A method of operating a hearing aid is further disclosed.

20 Claims, 9 Drawing Sheets

(58) Field of Classification Search
USPC .......................................................... 381/312
See application file for complete search history.

(56) References Cited

U.S. PATENT DOCUMENTS

2020/0221236 A1 7/2020 Jensen et al.
2020/0275217 A1* 8/2020 Guo ........................ H03G 9/18

OTHER PUBLICATIONS

Bramsløw "Preferred signal path delay and high-pass cut-off in open fittings", International Journal of Audiology, vol. 49, 2010, pp. 634-644 (12 pages total).

* cited by examiner

HEARING AID COMPRISING AN ITE-PART ADAPTED TO BE LOCATED IN AN EAR CANAL OF A USER

TECHNICAL FIELD

The present application relates to hearing devices, e.g. hearing aids or headsets, in particular to such devices consisting of or comprising a part adapted for being located at or in an ear canal of a user.

SUMMARY

The present disclosure deals particularly with a scheme for reducing comb-filter artefacts using an internal microphone facing the eardrum.

The comb-filter effect may e.g. arise in the ear canal of a user wearing a hearing aid due to mixing of directly propagated sound from the environment with a processed (delayed) version of the sound from the hearing aid.

The problem with comb-filter artefacts is particularly relevant in acoustic environments with a relatively broadband sound component, e.g. background sound, e.g. natural sounds (such as wind noise, waves, background babble, etc.) or other, e.g. artificially generated (relatively broadband) noise-sources (e.g. car noise or similar).

In hearing devices, e.g. headsets or hearing aids, where the processing delay is typically less than 10 ms, the problem with comb-filter artefacts is particularly relevant at lower frequencies, e.g. below 2.5 kHz. In this range, significant sound elements of normal speech are located, however (e.g. vowels and some consonants).

The hearing device may be configured to activate the removal of comb-filter artefacts in certain programs, or in a certain mode (or modes) of operation.

The hearing device may comprise an acoustic environment classifier for classifying a current acoustic environment around the hearing device and providing a sound class signal in dependence thereof.

The hearing device may be configured to activate a given program (or mode of operation) in dependence of the sound class signal.

The hearing device may be configured to activate the removal of comb-filter artefacts in dependence of the sound class signal.

The hearing device may be configured to activate (or deactivate) the removal of comb-filter artefacts in a specific mode of operation, e.g. chosen by the user via a user interface. The hearing device is configured to allow a user activation or deactivation of the removal of comb-filter artefacts to override an automatic activation or deactivation (e.g. via a choice of program or via the sound class signal).

A Hearing Aid:

In an aspect of the present application, a hearing aid configured to be worn at, and/or in, an ear of a user is provided. The hearing aid comprises

- an ITE-part adapted for being located at or in an ear canal of the user,
- a forward path for processing sound from the environment of the user, the forward path comprising
  - at least one first input transducer providing at least one first electric input signal representing said sound as received at the respective at least one first input transducer (e.g. a microphone), said at least one first input transducer being located to allow picking up sound from the environment of the user,
  - an audio signal processor comprising a gain unit for applying gain, e.g. including a frequency and/or level dependent prescribed gain to compensate for a hearing impairment of the user, to said at least one first electric input signal, or a signal or signals originating therefrom, and configured to provide a processed signal in dependence thereof, and
  - an output transducer for providing stimuli perceivable as sound to the user in dependence of said processed signal,
- at least one second input transducer providing at least one second electric input signal representing said sound as received at the at least one second input transducer, the at least one second input transducer being located in said ITE-part to pick up sound at the eardrum of the user, and
- a correlator configured to determine a correlation measure between the at least one second electric input signal, or a signal originating therefrom, and a signal of the forward path.

The hearing aid may further comprise

- a gain modifier configured to modify said gain of the gain unit in dependence of said correlation measure.

Thereby an improved hearing aid may be provided.

The ITE-part may comprise a mould or earpiece comprising a ventilation channel or a plurality of ventilation channels, or a dome-like structure comprising one or more openings, allowing an exchange of air with the environment, when the ITE-part is located at or in the ear canal of the user.

The hearing aid may comprise

- a comb filter effect gain modification estimator (e.g. comprising the gain modifier) configured to provide a modification gain to said gain unit for application to the at least one first electric input signal, or to a signal originating therefrom, in dependence of a comb filter effect control signal to thereby suppress the comb filter effect in the ear canal, the comb filter effect gain modification estimator comprising
  - a correlator configured to determine a correlation measure between the at least one second electric input signal, or a signal originating therefrom, and a signal of the forward path;
  - wherein said comb filter gain modification estimator is configured to provide said modification gain in dependence of said correlation measure;
- a comb filter effect gain controller configured to determine said comb filter effect control signal in dependence of one or more of a) a time delay of said forward path, b) an effective vent size of the ITE-part, c) a sound class signal indicative of a current acoustic environment around the hearing aid, and d) a property of said at least one first electric input signal;
- wherein said comb filter effect control signal is configured to activate or deactivate said comb filter gain modification estimator and, if activated, to apply said modification gain only to a critical frequency range below a threshold frequency expected to be prone to the comb-filter effect.

The comb filter effect control signal may be configured to only activate the comb filter gain modification estimator in certain acoustic environments where broadband sound is present or dominating as indicated by said sound class signal. Broadband sound may in the present context be taken to mean sound extending in frequency below the threshold frequency $f_{TH}$. Broadband sound may comprise an artificial random signal, e.g. similar to white noise or pink noise, or it may comprises natural sounds, such as wind noise, waves, babble, etc.

The comb filter effect control signal may be configured to only activate or deactivate the comb filter gain modification estimator when the property of the at least one first electric input signal is above a threshold value in the critical frequency range below the threshold frequency. A property of the at least one electric input signal may e.g. be its level. The comb filter effect control signal may be configured to only activate the comb filter gain modification estimator, if the at least one electric input signal is audible to the user, e.g. larger than a hearing threshold of the user in the frequency region below the threshold frequency $f_{TH}$, where the comb filter effect is expected to occur. The comb filter effect control signal may be configured to only activate the comb filter gain modification estimator, if the level of the at least one electric input signal is larger than a first minimum level. The first minimum level may e.g. be larger than 20-30 dB SPL. The comb filter effect control signal may be configured to only activate the comb filter gain modification estimator, if the frequency content (e.g. based on power spectral density (Psd)) in the frequency region below the threshold frequency $f_{TH}$, is larger than a second minimum value.

The correlation measure may e.g. be the circular cross-correlation (see e.g. Wikipedia entry accessible at https://en.wikipedia.org/wiki/Cross-correlation, at the time of filing of the present application, from which the below Eq. 4 is reproduced below).

For finite discrete functions $f, g \in \mathbb{C}^N$, the (circular) cross-correlation is defined as:

$$(f * g)[n] \triangleq \sum_{m=0}^{N-1} \overline{f[m]} g[(m+n)_{modN}]$$

where the horizontal line over f[m] denotes complex conjugate of the signals, m is a time index, and N is the length (in time samples) of the time window over which the correlation is calculated (the corresponding time may advantageously be larger than the delay of the hearing aid).

The equivalent continuous-time theoretical function is defined in chapter 7.4 of the textbook by [Randall; 1987] from which the following is extracted:

The cross-correlation function $R_{ab}(\tau)$ gives a measure of the extent to which two signals (a, b) correlate with each other as a function of the time displacement, T, between them. For transient signals, the cross-correlation function $R_{ab}(\tau)$ is defined by the formula $$R_{ab}(\tau)=\int_{-\infty}^{\infty} a(t)b(t+\tau)dt$$

which is equation (7.23) in [Randall; 1987].

Cross-correlation is a function of time and will have two distinct peaks, one at t~0 for the direct sound and one at t=x ms for the amplified sound, if the direct sound is considered the reference (cf. the example in FIG. 3). Here 'x' ('ΔD' in FIG. 3) represents the difference in delay through the hearing aid and directly propagated sound (e.g. through a ventilation channel or channels (here termed a 'vent'), e.g. approximated by the delay through the hearing aid (from input to input transducer, e.g. microphone, to output of output transducer, e.g. loudspeaker). This delay is known for a given hearing aid, e.g. smaller than 10 ms, such as between 3 ms and 10 ms. The correlation algorithm can be configured to measure at or around that delay, e.g. in range around said delay, e.g. +/−1 ms around the delay. And N in the above equation for the circular cross-correlation can be chosen to cover the appropriate range of the known delay. And the cross-correlation can be calculated as a complex entity, so that the phase is also known. The cross-correlation as defined above is a signed, unlimited entity, and the height of the abovementioned peaks indicates the magnitude difference at those delays, i.e. the gain in the direct path and the gain in the amplified path.

The term 'an ITE-part' is taken to mean a part of the hearing aid located at or in an ear canal of the user. The ITE-part also be term 'an earpiece'. The ITE-part may comprise a customized or standardized housing configured to be located at or in an ear canal of the user. The ITE-part may comprise loudspeaker outlet, e.g. for feeding sound from an acoustic tube connected loudspeaker of another part (e.g. a BTE-part adapted for being located at or behind an ear (pinna) of the user) to the ear canal of the user. The ITE-part may comprise a loudspeaker of the hearing aid.

The correlator may be configured to operate in the time-domain.

The hearing aid may comprise a transform unit, or respective transform units, for providing said at least one electric input signal, or a processed version thereof, in a transform domain. The transform unit(s) may comprise respective analysis filter banks configured to provide the at least one electric input signal in the (time-)frequency domain. The hearing aid may comprise at least one analysis filter bank configured to provide said at least one electric input signal in the frequency domain in a time-frequency representation (k, l), where k is a frequency band index, k=1, K, and l is a time index. The forward path of the hearing aid may be configured to operate in in a multitude of frequency bands. The K frequency bands may be of uniform width (bandwidth=BW, each in practice having a certain (unintended) overlap with neighboring frequency bands.

The gain modification estimator (e.g. the gain modifier) may be configured to operate in a multitude of frequency bands. The gain modification estimator (e.g. the gain modifier) may be configured to receive the cross-correlation as a time domain signal. The gain modification estimator (e.g. the gain modifier) may be configured to receive the cross-correlation as a (complex) frequency domain signal.

The comb filter gain modification estimator may be configured to provide the modification according to a gain rule or gain map so that:

- the modification gain decreases when approaching a cross-correlation value of −1 from above, and
- the modification gain increases when approaching a cross-correlation value of −1 from below.

The effective vent size of the ITE-part may be determined to correspond to dimensions of a single ventilation channel exhibiting an acoustic impedance equal to said ventilation channel or plurality of ventilation channels or one or more openings through the ITE-part.

The effective vent size of said ITE-part may be determined in advance of use of the hearing aid or adaptively during use. The effective vent size may e.g. be determined during power-on of the hearing aid, when it has freshly been mounted on the user.

The hearing aid may be configured to limit the gain modification to a frequency range below a threshold frequency ($f_{TH}$). The seriousness of the comb filter effect for a given hearing aid depends on its degree of openness (e.g. the (effective) vent size in an ITE-part) and the processing delay of the hearing aid. For a typical vent size of a hearing aid, and a typical processing delay, the comb filter effect may cause problems below a threshold frequency ($f_{TH}$), e.g. in a frequency range between 500 Hz and 2 kHz (see e.g. Bramslow, 2010). The threshold frequency ($f_{TH}$) may be determined in dependence of a vent size (e.g. an effective vent size) and a processing delay of the forward path of the hearing aid. The larger the processing delay ($D_{HA}$) of the hearing aid, the smaller the distance in frequency ($\Delta f_{comb}$) of the dips of the comb filter effect ($\Delta f_{comb}$ may be approximated by $1/D_{HA}$), i.e. the more disturbing it can be, cf. e.g. FIG. 1B.

The threshold frequency ($f_{TH}$) may be determined in dependence of a vent size (e.g. an effective vent size) of the ITE-part and the processing delay of the hearing aid. The vent size may relate to dimensions of a single (e.g. dedicated) ventilation channel or of a plurality of air-channels or openings through the ITE-part. The 'vent size of the ITE-part' may refer to a total or 'effective' vent size, e.g. corresponding to dimensions of a single ventilation channel exhibiting an acoustic impedance equal to that of the plurality of air-channels or openings through the ITE-part.

The threshold frequency ($f_{TH}$) may be in the range between 1.5 kHz and 3 kHz. The threshold frequency may be smaller than or equal to 2 kHz. The threshold frequency ($f_{TH}$) may be determined in dependence of the (low-pass) characteristics of the ventilation channel ('vent', its effective size), whereby a larger effective vent size leads to a higher cut-off frequency, and smaller vent size leads to a lower cut-off frequency.

The time delay of the forward path of the hearing aid may be determined in advance of use of the hearing aid or adaptively during use.

The threshold frequency may be determined in advance of use of the hearing aid or adaptively during use.

Activation of the comb-filter-effect-removal-feature may be dependent on an input level of the at least one first electric input signal from the at least one (first) input transducer (cf. e.g. XM in FIG. 2A). The gain modification may be activated when the input level of the at least one first electric input signal is above a critical level $L_{TH}$). Activation of the comb-filter-effect-removal-feature may be dependent on an input level of the at least one first electric input signal and the hearing loss of the user (e.g. implied by a prescribed gain). If e.g. the input level is relatively low (e.g. below a critical level $L_{TH}$), and the hearing loss is relatively high, e.g. above a threshold level, or that the prescribed gain is above a threshold level (e.g. at a given frequency), the risk that the directly propagated sound becomes comparable in level with the amplified sound of the hearing aid is low (and hence that the comb filter effect is less probable (audible)).

The signal of the forward path (being used to determine the correlation measure) may be the processed signal. In that case the cross-correlation is determined between the processed (amplified) signal from the audio signal processor and the second electric signal (or a signal derived therefrom) from the eardrum facing input transducer. Alternatively, other signals of the forward path may be used in combination with the second electric signal, e.g. the first electric input signal from the environment facing input transducer.

The correlator and the comb filter effect gain modification estimator (e.g. the gain modifier) may be configured to operate in a plurality of frequency bands. The hearing aid may comprise a further analysis filter bank for providing at least a lower frequency range of the at least one first electric input signal in a plurality of frequency bands, each representing a narrow frequency range of the lower frequency range, e.g. the frequency range below the threshold frequency ($f_{TH}$). The further analysis filter bank may be configured to provide the lower frequency range of at least one electric input signal in the frequency domain in a time-frequency representation (k', l'), where k' is a frequency band index, k'=1, . . . , K', and l' is a time index. The number of frequency bands K' may e.g. be smaller than the number of frequency bands K of the analysis filter bank of the forward path. Hence, the delay of the further analysis filter bank may be smaller than the delay of the analysis filter bank of the forward path. The K' frequency bands of the further analysis filter bank may be of uniform width (bandwidth BW'). The bandwidth (BW') of the frequency bands (k') of the further analysis filter bank may be smaller than the bandwidth (BW) of the analysis filter bank of the forward path. The time index l' may be equal to or different from the time index l.

The hearing aid may comprise an environment classifier for classifying a current acoustic environment around the hearing aid and providing a sound class signal in dependence thereof. Artifacts due to the comb filter effect may e.g. be generated in a dynamic acoustic environment (e.g. speech, or competing speakers). Comb-filter effect may, however, be most annoying in the presence of broadband sounds, e.g. natural sounds, such as waves, babble, wind noise, etc., at relatively constant background levels. It may hence be advantageous to control the gain modification estimator (e.g. the gain modifier and optionally the correlator) in dependence of the sound class signal, e.g. to only activate the gain modification estimator (e.g. the gain modifier) in certain acoustic environments where broadband sound is present or dominating.

Broadband sound may in the present context be taken to mean sound extending in frequency below the threshold frequency $f_{TH}$. Broadband sound may comprise an artificial random signal, e.g. similar to white noise or pink noise, or it may comprise natural sounds, such as wind noise, waves, babble, etc.

The hearing aid may be configured to activate the removal of comb-filter artefacts in dependence of the sound class signal.

The hearing aid may be constituted by or comprise an air-conduction type hearing aid.

The hearing aid may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing aid may comprise a signal processor for enhancing the input signals and providing a processed output signal.

The hearing aid may comprise an output unit for providing a stimulus perceived by the user as an acoustic signal based on a processed electric signal. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid). The output unit may (additionally or alternatively) comprise a transmitter for transmitting sound picked up-by the hearing aid to another device, e.g. of a far-end communication partner (e.g. via a network, e.g. in a telephone mode of operation, or in a headset configuration).

The hearing aid may comprise an input unit for providing an electric input signal representing sound. The input unit may comprise an input transducer, e.g. a microphone, for converting an input sound to an electric input signal. The input unit may comprise a wireless receiver for receiving a wireless signal comprising or representing sound and for providing an electric input signal representing said sound. The wireless receiver may e.g. be configured to receive an electromagnetic signal in the radio frequency range (3 kHz to 300 GHz). The wireless receiver may e.g. be configured to receive an electromagnetic signal in a frequency range of light (e.g. infrared light 300 GHz to 430 THz, or visible light, e.g. 430 THz to 770 THz).

The hearing aid may comprise a directional microphone system adapted to spatially filter sounds from the environment, and thereby enhance a target acoustic source among a multitude of acoustic sources in the local environment of the user wearing the hearing aid. The directional system may be adapted to detect (such as adaptively detect) from which direction a particular part of the microphone signal originates. This can be achieved in various different ways as e.g. described in the prior art. In hearing aids, a microphone array beamformer is often used for spatially attenuating background noise sources. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

Most sound signal sources (except the user's own voice) are located far way from the user compared to dimensions of the hearing aid, e.g. a distance $d_{mic}$ between two microphones of a directional system. A typical microphone distance in a hearing aid is of the order 10 mm. A minimum distance of a sound source of interest to the user (e.g. sound from the user's mouth or sound from an audio delivery device) is of the order of 0.1 m (>10 $d_{mic}$). For such minimum distances, the hearing aid (microphones) would be in the acoustic near-field of the sound source and a difference in level of the sound signals impinging on respective microphones may be significant. A typical distance for a communication partner is more than 1 m (>100 $d_{mic}$). The hearing aid (microphones) would be in the acoustic far-field of the sound source and a difference in level of the sound signals impinging on respective microphones is insignificant. The difference in time of arrival of sound impinging in the direction of the microphone axis (e.g. the front or back of a normal hearing aid) is $\Delta T = d_{mic}/v_{sound} = 0.01/343$ [s]=29 µs, where $v_{sound}$ is the speed of sound in air at 20° C. (343 m/s).

The hearing aid may comprise antenna and transceiver circuitry allowing a wireless link to an entertainment device (e.g. a TV-set), a communication device (e.g. a telephone), a wireless microphone, or another hearing aid, etc. The hearing aid may thus be configured to wirelessly receive a direct electric input signal from another device. Likewise, the hearing aid may be configured to wirelessly transmit a direct electric output signal to another device. The direct electric input or output signal may represent or comprise an audio signal and/or a control signal and/or an information signal.

In general, a wireless link established by antenna and transceiver circuitry of the hearing aid can be of any type. The wireless link may be a link based on near-field communication, e.g. an inductive link based on an inductive coupling between antenna coils of transmitter and receiver parts. The wireless link may be based on far-field, electromagnetic radiation. Preferably, frequencies used to establish a communication link between the hearing aid and the other device is below 70 GHz, e.g. located in a range from 50 MHz to 70 GHz, e.g. above 300 MHz, e.g. in an ISM range above 300 MHz, e.g. in the 900 MHz range or in the 2.4 GHz range or in the 5.8 GHz range or in the 60 GHz range (ISM=Industrial, Scientific and Medical, such standardized ranges being e.g. defined by the International Telecommunication Union, ITU). The wireless link may be based on a standardized or proprietary technology. The wireless link may be based on Bluetooth technology (e.g. Bluetooth Low-Energy technology), or Ultra WideBand (UWB) technology.

The hearing aid may be or form part of a portable (i.e. configured to be wearable) device, e.g. a device comprising a local energy source, e.g. a battery, e.g. a rechargeable battery. The hearing aid may e.g. be a low weight, easily wearable, device, e.g. having a total weight less than 100 g, such as less than 20 g.

The hearing aid may comprise a 'forward' (or 'signal') path for processing an audio signal between an input and an output of the hearing aid. A signal processor may be located in the forward path. The signal processor may be adapted to provide a frequency- and level-dependent gain according to a user's particular needs (e.g. hearing impairment). The hearing aid may comprise an 'analysis' path comprising functional components for analyzing signals and/or controlling processing of the forward path. Some or all signal processing of the analysis path and/or the forward path may be conducted in the frequency domain, in which case the hearing aid comprises appropriate analysis and synthesis filter banks. Some or all signal processing of the analysis path and/or the forward path may be conducted in the time domain.

An analogue electric signal representing an acoustic signal may be converted to a digital audio signal in an analogue-to-digital (AD) conversion process, where the analogue signal is sampled with a predefined sampling frequency or rate $f_s$, $f_s$ being e.g. in the range from 8 kHz to 48 kHz (adapted to the particular needs of the application) to provide digital samples $x_n$ (or x[n]) at discrete points in time $t_n$ (or n), each audio sample representing the value of the acoustic signal at $t_n$ by a predefined number $N_b$ of bits, $N_b$ being e.g. in the range from 1 to 48 bits, e.g. 24 bits. Each audio sample is hence quantized using $N_b$ bits (resulting in $2^{Nb}$ different possible values of the audio sample). A digital sample x has a length in time of $1/f_s$, e.g. 50 µs, for $f_s$=20 kHz. A number of audio samples may be arranged in a time frame. A time frame may comprise 64 or 128 audio data samples. Other frame lengths may be used depending on the practical application.

The hearing aid may comprise an analogue-to-digital (AD) converter to digitize an analogue input (e.g. from an input transducer, such as a microphone) with a predefined sampling rate, e.g. 20 kHz. The hearing aids may comprise a digital-to-analogue (DA) converter to convert a digital signal to an analogue output signal, e.g. for being presented to a user via an output transducer.

The hearing aid, e.g. the input unit, and or the antenna and transceiver circuitry may comprise a transform unit for converting a time domain signal to a signal in the transform domain (e g frequency domain or Laplace domain, etc.). The transform unit may be constituted by or comprise a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit (e.g. a Discrete Fourier Transform (DFT) algorithm, or a Short Time Fourier Transform (STFT) algorithm, or similar) for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing aid may be split into a number NI of frequency bands (e.g. of uniform width), where NI is e.g. larger than 5, such as larger than 10, such as larger than 50, such as larger than 100, such as larger than 500, at least some of which are processed individually. The hearing aid may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing aid may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing aid is reduced (e.g. to save power), e.g. to disable wireless communication, and/or to disable specific features of the hearing aid.

The hearing aid may comprise a number of detectors configured to provide status signals relating to a current physical environment of the hearing aid (e.g. the current acoustic environment), and/or to a current state of the user wearing the hearing aid, and/or to a current state or mode of operation of the hearing aid. Alternatively or additionally, one or more detectors may form part of an external device in communication (e.g. wirelessly) with the hearing aid. An external device may e.g. comprise another hearing aid, a remote control, and audio delivery device, a telephone (e.g. a smartphone), an external sensor, etc.

One or more of the number of detectors may operate on the full band signal (time domain) One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing aid may comprise a voice activity detector (VAD) for estimating whether or not (or with what probability) an input signal comprises a voice signal (at a given point in time). A voice signal may in the present context be taken to include a speech signal from a human being. It may also include other forms of utterances generated by the human speech system (e.g. singing). The voice activity detector unit may be adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing aid may comprise an own voice detector for estimating whether or not (or with what probability) a given input sound (e.g. a voice, e.g. speech) originates from the voice of the user of the system. A microphone system of the hearing aid may be adapted to be able to differentiate between a user's own voice and another person's voice and possibly from NON-voice sounds.

The number of detectors may comprise a movement detector, e.g. an acceleration sensor. The movement detector may be configured to detect movement of the user's facial muscles and/or bones, e.g. due to speech or chewing (e.g. jaw movement) and to provide a detector signal indicative thereof.

The hearing aid may comprise a classification unit configured to classify the current situation based on input signals from (at least some of) the detectors, and possibly other inputs as well. In the present context 'a current situation' may be taken to be defined by one or more of a) the physical environment (e.g. including the current electromagnetic environment, e.g. the occurrence of electromagnetic signals (e.g. comprising audio and/or control signals) intended or not intended for reception by the hearing aid, or other properties of the current environment than acoustic);

b) the current acoustic situation (input level, feedback, etc.), and c) the current mode or state of the user (movement, temperature, cognitive load, etc.);

d) the current mode or state of the hearing aid (program selected, time elapsed since last user interaction, etc.) and/or of another device in communication with the hearing aid.

The classification unit may be based on or comprise a neural network, e.g. a trained neural network, e.g. a recurrent neural network, such as a gated recurrent unit (GRU).

The hearing aid may comprise an acoustic (and/or mechanical) feedback control (e.g. suppression) or echo-cancelling system. Adaptive feedback cancellation has the ability to track feedback path changes over time. It is typically based on a linear time invariant filter to estimate the feedback path but its filter weights are updated over time. The filter update may be calculated using stochastic gradient algorithms, including some form of the Least Mean Square (LMS) or the Normalized LMS (NLMS) algorithms. They both have the property to minimize the error signal in the mean square sense with the NLMS additionally normalizing the filter update with respect to the squared Euclidean norm of some reference signal.

The hearing aid may further comprise other relevant functionality for the application in question, e.g. compression, noise reduction, etc.

The hearing aid may comprise a hearing instrument, e.g. a hearing instrument adapted for being located at the ear or fully or partially in the ear canal of a user, e.g. a headset, an earphone, an ear protection device or a combination thereof. A hearing system may comprise a speakerphone (comprising a number of input transducers and a number of output transducers, e.g. for use in an audio conference situation), e.g. comprising a beamformer filtering unit, e.g. providing multiple beamforming capabilities.

Use:

In an aspect, use of a hearing aid as described above, in the 'detailed description of embodiments' and in the claims, is moreover provided. Use may be provided in a system comprising one or more hearing aids (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing aid is is furthermore provided by the present application. The hearing aid comprises

- an ITE-part adapted for being located at or in an ear canal of the user,
- a forward path from a first input transducer to an output transducer via an audio signal processor,
  - the first input transducer being configured to provide a first electric input signal representative of sound in an environment of the user at the first input transducer,
  - the audio signal processor being configured to apply a prescribed gain to said first electric input signal, or to a signal or signals originating therefrom, to compensate for a hearing impairment of the user, and to provide a processed signal in dependence thereof,
  - the output transducer being configured to provide stimuli perceivable by the user as sound in dependence of said processed signal, and
- a second input transducer located in the ITE-part to pick up sound at the eardrum of the user, the second input transducer providing a second electric input signal representing sound as received at the second input transducer.

The method comprises

- determining a time delay of the forward path through the hearing aid from an acoustic input of the input transducer to an acoustic output of the output transducer;
- selecting one or more frequencies or frequency ranges expected to be prone to the comb-filter effect in dependence of said time delay;
- calculating a current value of cross-correlation between said second electric input signal, or a signal originating therefrom, and a signal of the forward path.

The method may further comprise

- creating a gain rule or gain map for determining a gain modification in dependence of cross-correlation;
- determining a current gain modification in dependence of said current value of the cross-correlation; and
- applying said gain modification to said first electric input signal or to a signal originating therefrom.

It is intended that some or all of the structural features of the device described above, in the 'detailed description of embodiments' or in the claims can be combined with embodiments of the method, when appropriately substituted by a corresponding process and vice versa. Embodiments of the method have the same advantages as the corresponding devices.

The audio signal processor is configured to apply a frequency and/or level dependent prescribed frequency and level dependent gain ($G_{pr}$) to said first electric input signal, or to a signal or signals originating therefrom, intended to compensate for a hearing impairment of the user. The audio signal processor may be configured to apply the current (comb-filter effect) gain modification ($\Delta G$) in addition to prescribed gain ($G_{pr}$). The result of the sum of the current prescribed gain ($G_{pr}$) and the current gain modification ($\Delta G$), may be larger than or smaller than the current prescribed gain ($G_{pr}$), because the current gain modification ($\Delta G$) may be positive or negative (cf. e.g. $\Delta G+$ and $\Delta G-$, respectively, in FIG. 5, representing a gain map or gain rule (algorithm)). The prescribed gain ($G_{pr}$) and the gain modification ($\Delta G$) may be expressed in dB (as logarithmic entities). The maximum (comb-filter effect) gain modification $\Delta G+$(or $\Delta G-$) may e.g. be larger than or equal to 3 dB, such as larger than or equal to 6 dB (see e.g. FIG. 5). The prescribed gain ($G_{pr}$) and the gain modification ($\Delta G$) may be alternatively expressed as linear entities ($G'_{pr}$, $\Delta G'$) in which case the resulting gain is a product of the two linear gains ($G'_{pr}$,$\Delta G'$), and where $\Delta G'$ may be smaller than or equal to one, or larger than one.

The step of selecting one or more frequencies or frequency ranges may comprise confining said selecting to frequencies below a threshold frequency $f_{TH}$, where said threshold frequency $f_{TH}$ is smaller than or equal to 4 kHz. The threshold frequency, $f_{TH}$, may e.g. be smaller than or equal to 3 kHz, or 2 kHz. The threshold frequency, $f_{TH}$, may e.g. be in a range between 1.5 kHz and 3 kHz.

The cross-correlation function may be configured to provide the cross-correlation as amplitude and phase information. The hearing aid may be configured to provide the cross-correlation function as real and imaginary parts.

The cross-correlation function may be determined in a time frequency representation (k', l'), where k' is a frequency index and l' is a time index. The time index l' may represent a specific time-frame of the second electric input signal.

The correlation function may be provided in the complex domain as complex values comprising a real and an imaginary part. A critical region for a given frequency or frequency range selected as being prone to the comb-filter effect may be defined in terms of the real and imaginary parts of said complex cross-correlation function. The critical region may be defined around the point (Re, Im)=(−1, 0) in the complex plane. The critical region around (Re, Im)=(−1, 0) may e.g. be defined as the region where action is taken, e.g. to change the gain of the amplified signal (prescribed gain) according to a gain rule. The critical region may be defined by interval ($\Delta CC_{Re}$) along the real axis, where the interval ($\Delta CC_{Re}$) along the real axis may be expressed as $\Delta CC_{Re}=CC_{Re,max}-CC_{Re,min}$, e.g. so that $CC_{Re,max}=-0.5$ and $CC_{Re,min}=-1.5$ (so that $\Delta CC_{Re}=1$).

The critical region around (Re, Im)=(−1, 0) may be defined to extend between respective minimum values ($CC_{Re,min}$, $CC_{Im,min}$) and maximum values ($CC_{Re,max}$, $CC_{Im,max}$) on the real axis and the imaginary axis, where the minimum and maximum values of cross-correlation along the real axis are smaller than −1 and larger than −1 respectively ($CC_{Re,min}<-1<CC_{Re,max}$) and where the minimum and maximum values of cross-correlation along the imaginary axis are smaller than 0 and larger than 0 respectively ($CC_{Im,min}<0<(CC_{Im,max}$). The critical region may be defined by intervals ($\Delta CC_{Re}$ and $\Delta CC_{Im}$) along the real and imaginary axes, respectively, where the interval ($\Delta CC_{Re}$) along the real axis may be expressed as $\Delta CC_{Re}=CC_{Re,max}-CC_{Re,min}$, and the where the interval ($\Delta CC_{Im}$) along the imaginary axis may be expressed as $\Delta CC_{Im}=CC_{Im,max}-CC_{Im,min}$. The intervals ($\Delta CC_{Re}$ and $\Delta CC_{Im}$) may e.g. be symmetrically distributed around the critical point (Re, Im)=(−1, 0), e.g. as a circular region as illustrated in FIG. 4. The values of $\Delta CC_{Re}$ and $\Delta CC_{Im}$, may be equal or different, e.g. each of the order of 0.2 or 0.1. The values of $\Delta CC_{Re}$ and $\Delta CC_{Im}$, may be equal or different for different frequency bands or ranges.

The gain rule or gain map may be configured to either increase or decrease the current gain modification when the cross-correlation approaches a value of −1 along the real axis to avoid or decrease comb-filter artefacts. In case the gain is increased, the hearing aid sound will be dominating. In case the gain is decreased, the directly propagated sound will be dominating (in the frequency range considered).

A Computer Readable Medium or Data Carrier:

In an aspect, a tangible computer-readable medium (a data carrier) storing a computer program comprising program code means (instructions) for causing a data processing system (a computer) to perform (carry out) at least some (such as a majority or all) of the (steps of the) method described above, in the 'detailed description of embodiments' and in the claims, when said computer program is executed on the data processing system is furthermore provided by the present application.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Other storage media include storage in DNA (e.g. in synthesized DNA strands). Combinations of the above should also be included within the scope of computer-readable media. In addition to being stored on a tangible medium, the computer program can also be transmitted via a transmission medium such as a wired or wireless link or a network, e.g. the Internet, and loaded into a data processing system for being executed at a location different from that of the tangible medium.

A Computer Program:

A computer program (product) comprising instructions which, when the program is executed by a computer, cause the computer to carry out (steps of) the method described above, in the 'detailed description of embodiments' and in the claims is furthermore provided by the present application.

A Data Processing System:

In an aspect, a data processing system comprising a processor and program code means for causing the processor to perform at least some (such as a majority or all) of the steps of the method described above, in the 'detailed description of embodiments' and in the claims is furthermore provided by the present application.

A Hearing System:

In a further aspect, a hearing system comprising a hearing aid as described above, in the 'detailed description of embodiments', and in the claims, AND an auxiliary device is moreover provided.

The hearing system may be adapted to establish a communication link between the hearing aid and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing aid(s). The function of a remote control may be implemented in a smartphone, the smartphone possibly running an APP allowing to control the functionality of the hearing aid or hearing system via the smartphone (the hearing aid(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing aid.

The auxiliary device may be constituted by or comprise another hearing aid. The hearing system may comprise two hearing aids adapted to implement a binaural hearing system, e.g. a binaural hearing aid system.

An APP:

In a further aspect, a non-transitory application, termed an APP, is furthermore provided by the present disclosure. The APP comprises executable instructions configured to be executed on an auxiliary device to implement a user interface for a hearing aid or a hearing system described above in the 'detailed description of embodiments', and in the claims. The APP may be configured to run on cellular phone, e.g. a smartphone, or on another portable device allowing communication with said hearing aid or said hearing system.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
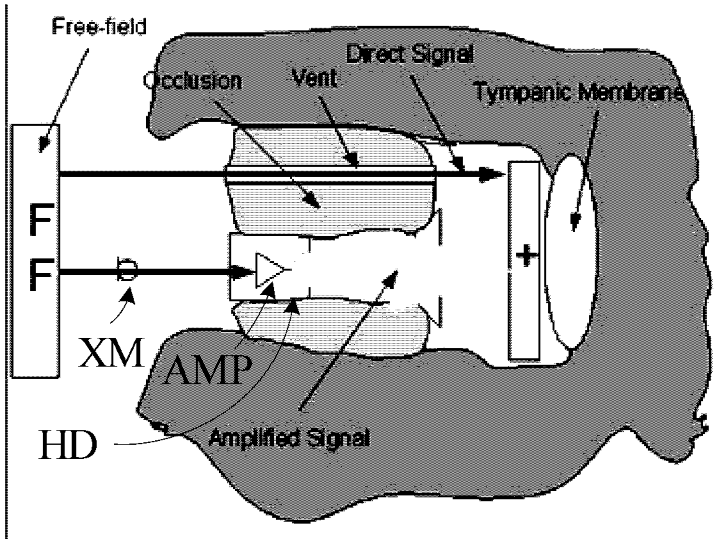
FIG. 1A shows a hearing device comprising an ITE-part located in an ear canal of a user, the ITE-part comprising a ventilation channel for minimizing occlusion.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as “elements”). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The present application relates to the field of hearing devices, e.g. hearing aids or headsets. The present disclosure deals particularly with a scheme for reducing comb-filter artefacts using an internal microphone and a cross-correlation method.

All digital hearing aids have a processing delay. Typically, a hearing aid is fitted with an ITE-part (e.g. a mould) including a vent or a dome with a large vent opening. The summation of the delayed hearing aid sound and the direct vent sound can cause cancellation of the sound at given frequencies (cf. e.g. [Bramslow; 2010]), which are inversely proportional to the delay. In practice, a vent may, however, have a frequency dependent delay that makes the distance between the dips, non-uniform. For a given vent, its frequency response may be measured (known). The cancellation (destructive interference) occurs only when the phase shift between the two contributions is 180 degrees and the magnitudes are roughly equal.

FIG. 1A shows a hearing device (HD), e.g. a hearing aid, comprising an ITE-part (e.g. an earpiece comprising a mould, ‘Occlusion’ in FIG. 1A) located in an ear canal of a user. The ITE-part comprises a ventilation channel (Vent' in FIG. 1A) for minimizing the effect of the occlusion, venting out moisture and equalize the static pressure. The hearing device (HD) comprises an environment facing ‘external’ microphone (XM) for picking up sound from the environment (e.g. from a sound source in an acoustic far-field relative to the user, as indicted by rectangle ‘FF’ denoted ‘Free-field’ and arrow through the microphone symbol denoted ‘XM’ in FIG. 1A). The environment facing microphone (XM) may form part of the ITE-part (e.g. be located in a housing of the ITE-part) or be located separately, e.g. in the outer ear (pinna), e.g. in concha, but electrically connected to the ITE-part, e.g. via a cable. The electric input signal provided by the environment facing microphone (XM) is amplified by signal processor (‘AMP in FIG. 1A) and the resulting signal (indicated by (ultra-bold) arrow denoted ‘Amplified signal’ in FIG. 1A) is fed to an output transducer and presented at the user’s eardrum (cf. ‘Tympanic membrane’ in FIG. 1A). The environment sound also reaches the user’s eardrum via the ventilation channel (see arrow denoted ‘Direct Signal’ from the sound source (FF) to the rectangle denoted ‘+’ in FIG. 1A). The rectangle denoted ‘+’ in FIG. 1A implies acoustic mixing of A) the direct signal propagated through the ventilation channel (Vent) and B) the processed (amplified and delayed) signal provided by the hearing device.

Figure 1B:
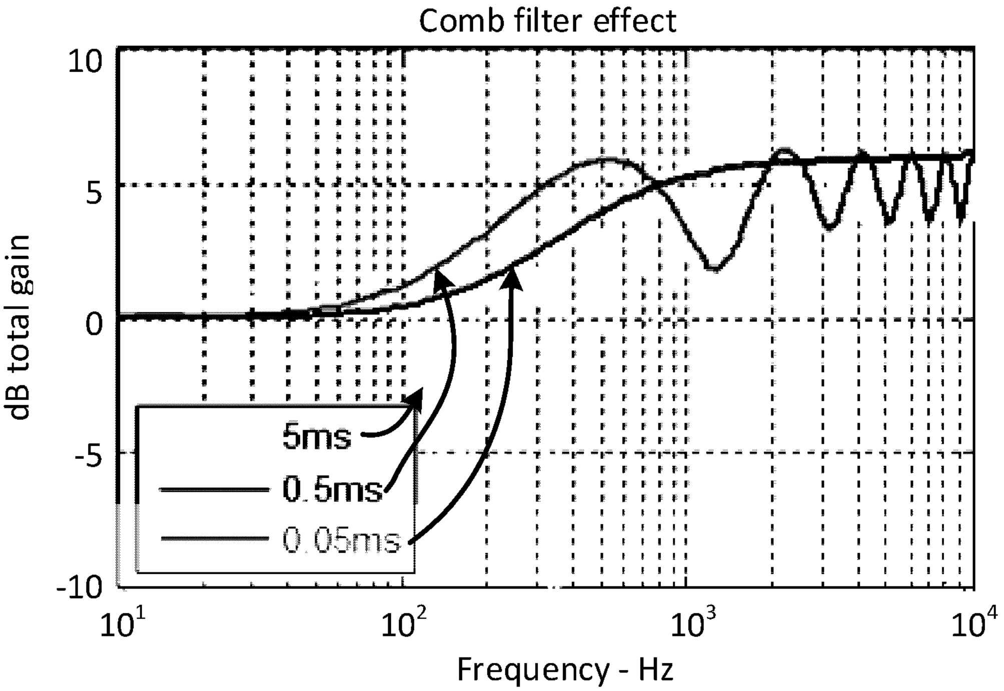
FIG. 1B illustrates the comb-filter effect originating from the combination at the eardrum of directly propagated sound and amplified sound played by a loudspeaker of the hearing device.

FIG. 1B illustrates the comb-filter effect originating from the combination at the eardrum of directly propagated sound and amplified (delayed) sound played by a loudspeaker of the hearing device, e.g. a hearing aid. Examples of the comb filter effect for three different delay differences ΔD1=0.05 ms, ΔD2=0.5 ms, and ΔD3=5 ms. The delays (ΔD1, ΔD2, ΔD3) represent differences in delay between the sound provided by the output transducer of the hearing aid and the directly propagated sound from the environment (arriving at the eardrum through intended or un-intended ventilation (leakage) channels). The graph shows ‘dB total gain (vertical scale −10 dB to +10 dB) versus frequency in Hz (horizontal scale 10 Hz ($10^1$ Hz) to 10 kHz ($10^4$ Hz). The graph represents the comb filter effect for a given ventilation channel and a flat (frequency independent) gain of the hearing device of 5 dB for the three different delays (differences in propagation time).

The distance in frequency between the dips (valley-low-points) provided by the comb filter effect is approximately the reciprocal value of the delay difference (ΔD), cf. also

[Bramslow; 2010]. For ΔD=5 ms, 1/ΔD=200 Hz, as also appears from the graph in FIG. 1B for ΔD=5 ms. As is apparent from FIG. 1B, the comb filter effect (for the vent in question and a frequency range up to 10 kHz) is absent for a delay difference below 0.05 ms. So, the lower the latency of the hearing device, the lesser of a problem presents the comb filter effect.

The propagation delay $\tau_{dir}$ of the direct acoustic path through a ventilation channel is typically smaller (e.g. more than 5-10 times smaller) than the forward signal propagation delay $\tau_{HI}$ of the hearing device, such as much smaller (e.g. more than 100-1000 times smaller) than $\tau_{HI}$. The forward signal propagation delay $\tau_{HI}$ of the hearing device may e.g. be of the order of 10 ms, e.g. in the range between 2 ms and 12 ms. The propagation delay $\tau_{dir}$ of the direct acoustic path through a ventilation channel may be approximated by the length of the vent WO divided by the speed of sound in air ($v_{sound}$). For a vent length of 15 mm, $\Delta T=d_L/v_{sound}=0.015/343$ [s]=44 μs, where $v_{sound}$ is the speed of sound in air at 20° C. (343 m/s). In other words, for a typical delay of a direct propagation path in a hearing aid of the order of $\tau_{dir}$ 50 μs and a typical latency in processing through a hearing aid of the order of $\tau_{HI}$~5 ms, $\tau_{HI}/\tau_{dir}$~100. Hence the delay difference may be approximated with the latency of the hearing device.

The proposed system is based on an internal (e.g. eardrum facing) microphone picking up the signal on the inside of the hearing aid (facing the eardrum), thus monitoring the actual signal reaching the eardrum as the sum of the direct and the delayed, amplified sound, as described in the following.

Figure 2A:
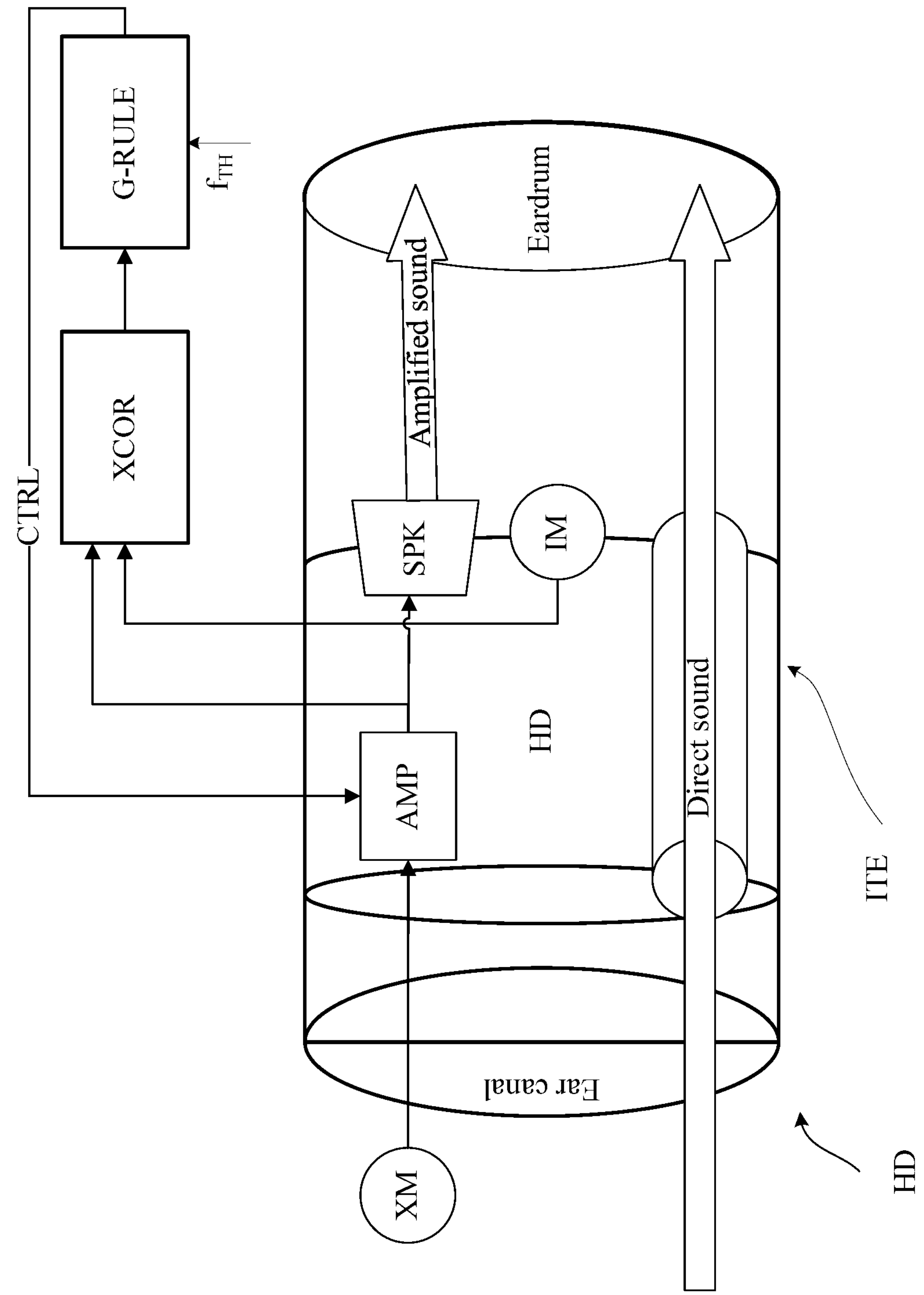
FIG. 2A shows a simplified block diagram of a first embodiment of a hearing device or a part of a hearing device comprising an ITE-part located in an ear canal of the user.
Figure 2B:
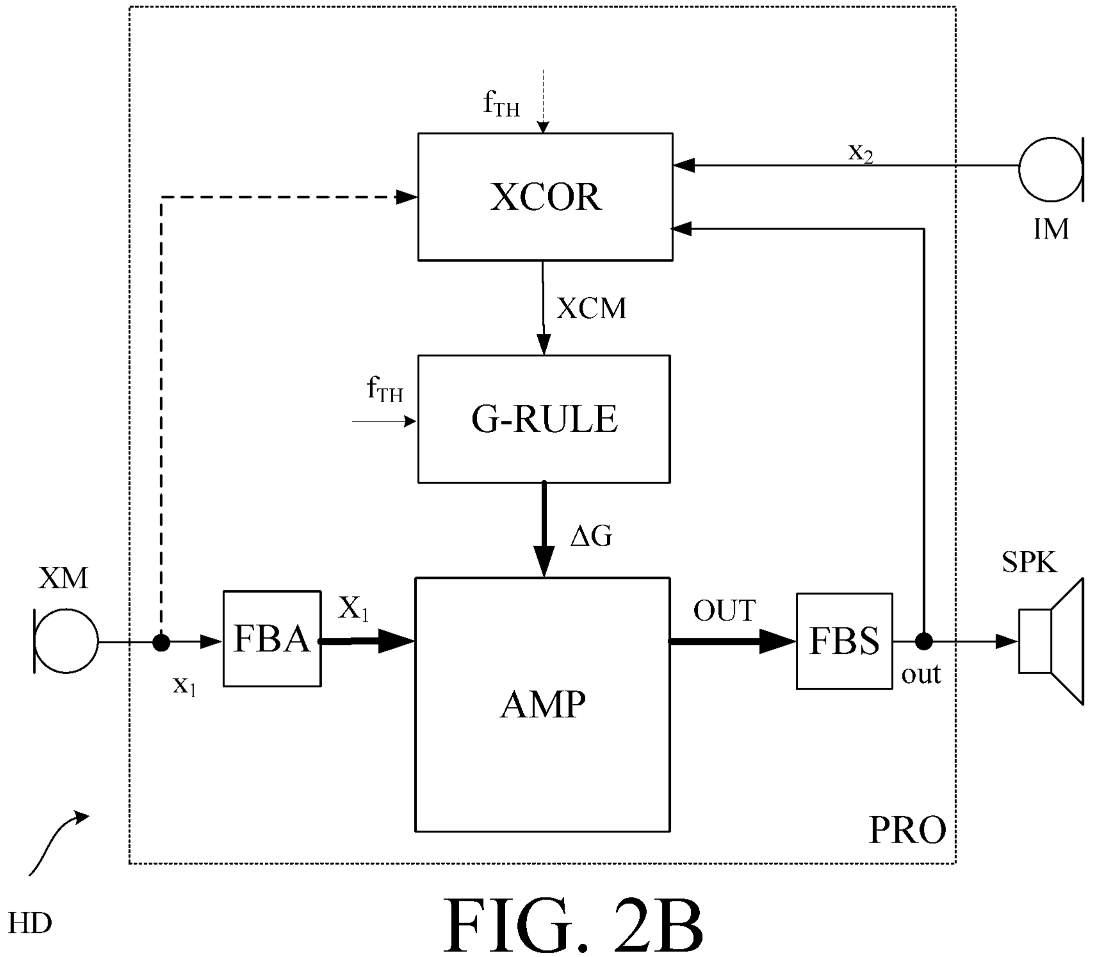
FIG. 2B shows a simplified block diagram of a second embodiment of a hearing device or a part of a hearing device comprising an ITE-part located in an ear canal of the user, FIG. 3 schematically shows absolute value of cross-correlation (|Cross-cor|) versus time (time) and an exemplary delay between a directly propagated sound component and the same sound component having been processed (and typically amplified) in a forward path of the hearing device from a microphone to a loudspeaker, FIG. 4 schematically shows a complex cross-correlation function resolved in real (Re) and imaginary (Im) parts, which together provides magnitude and phase of the cross-correlation.

FIG. 2A shows a simplified block diagram of a first embodiment of a hearing device (HD) or a part of a hearing device comprising an ITE-part (ITE) located in an ear canal (Ear canal) of the user. The hearing device (HD) may be a hearing aid configured to be worn at, and/or in, an ear of a user, e.g. at least partially (e.g. entirely) in an ear canal of the user. The hearing aid comprises a forward path for processing sound from the environment of the user. The forward path comprises a first input transducer (here a microphone (XM)) providing a first electric input signal representing sound from the environment as received at the input transducer. The first input transducer is located to allow picking up sound from the environment of the user, e.g. in the housing of the ITE-part facing the environment or electrically connected to the ITE-part but located at the ear canal opening facing the environment, or located near the ear canal opening, e.g. in pinna, e.g. in concha. The forward path further comprises an audio signal processor (AMP) comprising a gain unit for applying a frequency and/or level dependent gain to compensate for a hearing impairment of the user to the first electric input signal, or a signal or signals originating therefrom. The audio signal processor (AMP) is configured to provide a processed signal in dependence first electric input signal and the applied prescribed gain. The forward path further comprises an output transducer (SPK), e.g. a loudspeaker, for providing stimuli perceivable as sound to the user in dependence of said processed signal. The hearing aid further comprises a second input transducer (e.g. a microphone (IM)) providing a second electric input signal representing sound as received at the second input transducer. The second input transducer (IM) is located in the ITE-part to pick up sound at the eardrum of the user (e.g. facing the ear drum), e.g. to pick up sound in the residual volume between an eardrum facing end of the housing of the ITE-part (ITE) and the eardrum (Eardrum). The hearing aid further comprises a correlator (XCOR), e.g. a cross-correlation unit, configured to determine a correlation measure (e.g. a cross-correlation) between the second electric input signal, or a signal originating therefrom, and a signal of the forward path, e.g. from the audio signal processor (AMP) or (as indicated in FIG. 2B by dashed arrow denoted $x_1$) from the first input transducer (XM), or a signal originating therefrom. The hearing aid further comprises a gain modifier (G-RULE) configured to modify the (prescribed) gain of the gain unit (AMP) in dependence of the correlation measure. The hearing aid may be configured to limit the gain modification to a frequency range below a threshold frequency ($f_{TH}$), as indicated in FIG. 2A by the input ($f_{TH}$) to the gain modifier (G-RULE). The threshold frequency ($f_{TH}$) may e.g. be smaller than or equal to 4 kHz, e.g. be smaller than or equal to 3 kHz, or 2 kHz. The threshold frequency, $f_{TH}$, may e.g. be in a range between 1.5 kHz and 3 kHz. The correlator (XCOR) may be configured to provide the correlation function (e.g. the cross-correlation) as amplitude and phase information, or as a complex value comprising the real and imaginary parts.

The ITE-part may comprise a housing, e.g. a hard earmould, comprising a ventilation channel or a plurality of ventilation channels, or a soft, flexible dome-like structure comprising one or more openings, allowing an exchange of air with the environment, when the ITE-part is located at or in the ear canal of the user. In the embodiment of FIG. 2A, the ITE-part comprises a single ventilation channel, symbolized by the throughgoing cylinder with arrow denoted 'Direct sound' to indicate a direct acoustic propagation path of sound from the environment to the ear drum (and also the other way from the residual volume to environment to fulfil its intended task of diminishing the user's sense of occlusion). The sound provided by the hearing aid output transducer (played into the residual volume) is indicated by arrow denoted 'Amplified signal' in FIG. 2A. The mixture of the two acoustic components (directly propagated and amplified (delayed) versions of the environment sound) may result in the comb filter effect.

FIG. 2B shows a simplified block diagram of a second embodiment of a hearing device, e.g. a hearing aid, or a part of a hearing device comprising an ITE-part located in an ear canal of the user. The embodiment of FIG. 2B is functionally similar to the embodiment of FIG. 2A, except that the processing in the forward path of the embodiment of FIG. 2B is specifically indicated to be performed in the frequency domain (in a multitude of frequency sub-bands) implemented by respective analysis (FBA) and synthesis (FBS) filter banks connected between the input transducer (environment-facing microphone (XM)) and the audio signal processor (AMP) and between the audio signal processor (AMP) and the output transducer (loudspeaker (SPK)), respectively. The analysis filter bank is configured to convert the time-domain electric input signal ($x_1$) from microphone (XM) to an electric input signal ($X_1$) in the frequency domain in a time-frequency representation (k, l), where k is a frequency band index, k=1, K, K is the number of (e.g. uniform) frequency bands, and l is a time index. The analysis filter bank (FBA) may e.g. be implemented by a Fourier transform algorithm, e.g. DFT or STFT. The frequency sub-band signals ($X_1$) are fed to the audio signal processor (AMP), e.g. for being processed to compensate for a hearing loss of the user (and enhanced to reduce noise (including a compensation for the comb filter effect according to the present disclosure, cf. gain modification input ΔG from the gain modifier (G-RULE) for modifying the prescribed gain (and possible other gain modifications intended to enhance the quality of the signal presented to the user, e.g. to increase speech intelligibility). The processed frequency sub-band signals (OUT) are fed to the synthesis filter bank (FBS) for being converted to a processed time-domain signal (out) for being presented to the user via loudspeaker (SPK).

The correlator (XCOR) and/or the gain modifier (G-RULE) may e.g. be configured to operate in a plurality of frequency bands. The hearing aid may e.g. comprise a further analysis filter bank for providing at least a lower frequency range of the at least one first electric input signal in a plurality of frequency bands, each representing a narrow frequency range within the lower frequency range. The lower frequency range may e.g. be or include the frequency range below the threshold frequency ($f_{TH}$). The further analysis filter bank (e.g. forming part of the correlator (XCOR) in FIG. 2B, or be located between the output of the microphone (XM) and the correlator (XCOR)) may be configured to provide the lower frequency range of the electric input signal ($x_1$) in the frequency domain in a time-frequency representation (k', l'), where k' is a frequency band index, k'=1, K', and l' is a time index. The number of frequency bands K' may e.g. be smaller than the number of frequency bands K of the analysis filter bank (FBA) of the forward path. Hence, the delay of the further analysis filter bank may be smaller than the delay of the analysis filter bank of the forward path. The K' frequency bands of the further analysis filter bank may be of uniform width (bandwidth BW'). The bandwidth (BW') of the frequency bands (k') of the further analysis filter bank may be smaller than the bandwidth (BW) of the analysis filter bank of the forward path, e.g. smaller than 150 Hz, such as smaller than 100 Hz, e.g. smaller than 75 Hz. The time index l' may be equal to or different from the time index l. Thereby the correlation function may be provided in the complex domain (as complex values comprising a real and an imaginary part, as e.g. discussed in connection with FIGS. 4 and 5. The correlator (XCOR) and the gain modifier (G-RULE) are thereby limited to the frequencies of interest (e.g. below the threshold frequency ($f_{TH}$)). The band distribution unit may distribute gains from the narrower representation of the correlator to the coarser representation of the forward path. The band distribution unit may be located between the correlator (XCOR) and the gain modifier (G-RULE) (e.g. forming part of one or the other) or be located between the gain modifier (G-RULE) and the audio signal processor (AMP) (e.g. forming part of one or the other).

The functional blocks filter bank (FBA, FBS), audio signal processor (AMP), correlator (XCOR), gain modifier (G-RULE) may e.g. be implemented in the digital domain and form part of the same digital signal processor, as indicated by dotted enclosure (denoted PRO in FIG. 2B). The digital signal processor (PRO) receives (e.g. digitized) time-domain electric input signals from one or more input transducers (here environment-facing microphone (XM) and eardrum-facing microphone (IM)) and delivers a processed (enhanced) time-domain signal to the output transducer (here loudspeaker (SPK) for playing sound to the user's eardrum).

The cross-correlation calculated by correlation unit (XCOR) in the embodiments of FIGS. 2A and 2B is the correlation between the amplified electrical signal ('out' in FIG. 2B) and the signal ($x_2$ in FIG. 2B) from the internal (eardrum-facing) microphone (IM). This is schematically illustrated in FIG. 3.

Figure 3:
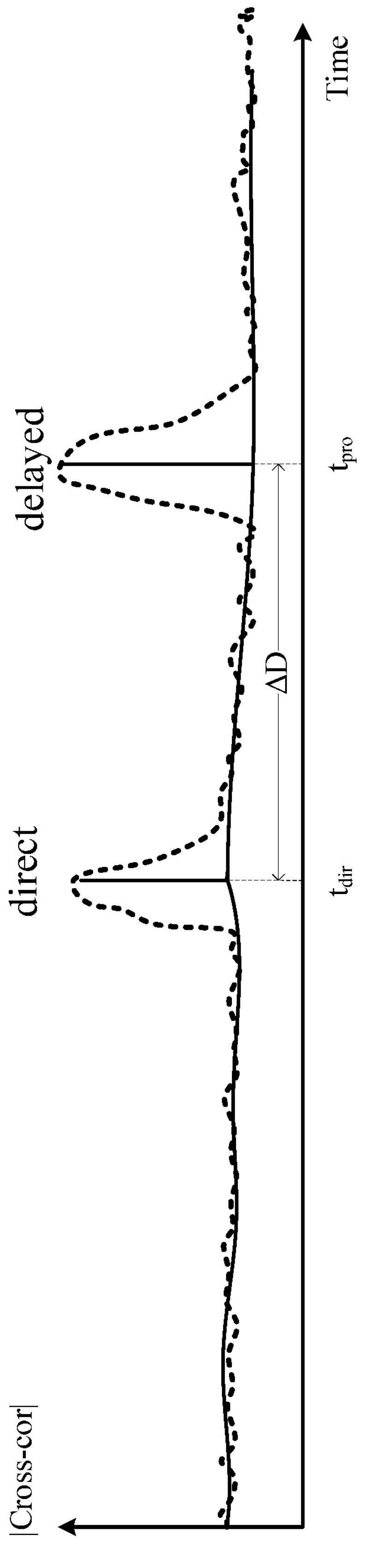

FIG. 3 schematically shows absolute value of cross-correlation (|Cross-cor|) versus time (time) and an exemplary delay difference (ΔD) between a directly propagated sound component and the same sound component having been processed (and typically amplified, and delayed) in a forward path of the hearing device, e.g. a hearing aid, from a microphone to a loudspeaker.

The cross-correlation (|Cross-cor|) is a function of time and will have two distinct peaks, one at t~0 ($t_{dir}$) for the direct sound and one at t=x ms ($t_{pro}$), the processed (amplified) sound of the hearing device, if the direct sound is considered the reference. This delay ($\Delta D=t_{pro}-t_{dir}$=x ms) is known for a given hearing aid style (design parameter), and the algorithm can be configured to measure cross-correlation at that delay (or within a range of that delay ΔD, e.g. +/10-20%). The dashed-line graph may represent a real course and the solid-line graph with distinct (delta-function-like) peaks at $t=t_{dir}$ and at $t=t_{pro}$ is an idealized (or processed version).

The cross-correlation can be calculated as a complex entity, so that the phase is also known. This is illustrated in FIG. 4.

Figure 4:
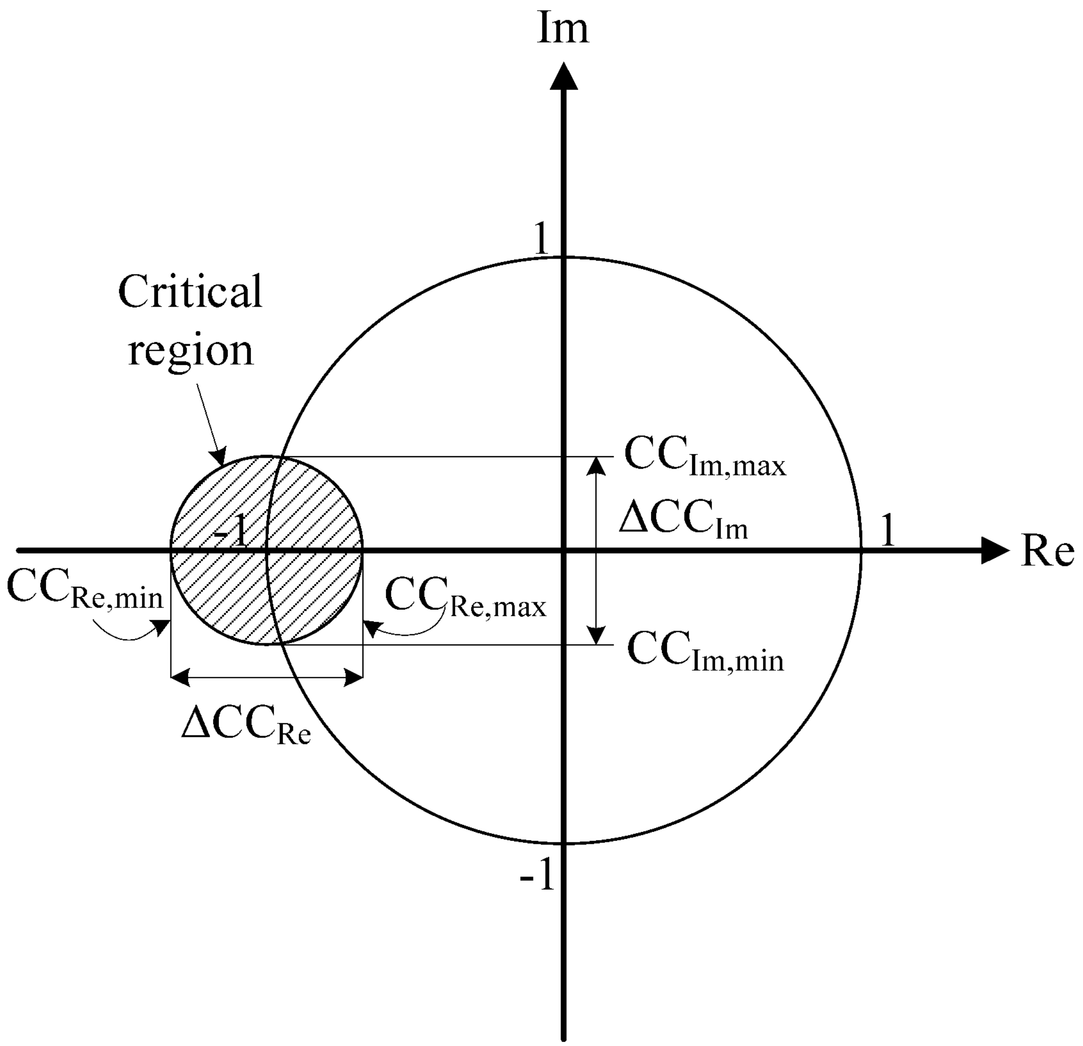

FIG. 4 shows a complex cross-correlation function resolved in real (Re) and imaginary (Im) parts, which together provides magnitude and phase of the cross-correlation. The complex cross-correlation (CC) describes both magnitude (MAG) and phase (PHA) of the cross-correlation function ($CC=MAG\ e^{jPHA}$). The real and imaginary parts of the cross-correlation function are given by Re(CC)=MAG·cos(PHA) and Im(CC)=MAG·sin(PHA), respectively. The cancellation (responsible for the comb filter effect) occurs when the real part Re(cross-corr)~−1 and the imaginary part Im(cross-corr)=0, corresponding to magnitude=1 and phase=180°. A critical region for occurrence of the comb filter effect can be defined around that point (Re, Im)=(−1, 0), as illustrated in FIG. 4 by the hatched region around (Re, Im)=(−1, 0). The critical region (denoted 'Critical region' in FIG. 4) around (Re, Im)=(−1, 0) may e.g. be defined as the region where an action is taken, e.g. to change gain of the amplified signal according to a gain rule. The critical region around (Re, Im)=(−1, 0) may e.g. be defined as indicated in FIG. 4 to extend ($\Delta CC_{Re}$, $\Delta CC_{Im}$), e.g. symmetrically (e.g. as a circular region as illustrated in FIG. 4), around the point (Re, Im)=(−1, 0). The values of $\Delta CC_{Re}$ and $\Delta CC_{Im}$, may be equal or different, e.g. each of the order of 0.2 or 0.1. The critical region along the real axis may extend between a minimum value ($CC_{Re,min}$) and a maximum value ($CC_{Re,max}$), i.e. $\Delta CC_{Re}$,$=CC_{Re,max}-CC_{Re,min}$. Likewise, the critical region along the imaginary axis may extend between a minimum value ($CC_{Im,min}$) and a maximum value ($CC_{Im,max}$), i.e. $\Delta CC_{Im}$,$=CC_{Im,max}-CC_{Im,min}$. The critical region may e.g. be rectangular, e.g. with an asymmetric extension around (Re, Im)=(−1, 0), e.g. in that $\Delta CC_{Re}$ is moved towards (0, 0) instead of being symmetrical around (−1, 0).

The critical region may have different size for different frequency bands, e.g. larger in regions known to be prone to experience the comb-filter effect for the particular hearing aid style in question.

Instead of using the receiver signal (the amplified output signal (denoted 'out' in FIG. 2B)) as a reference for the cross-correlation, as shown in FIG. 2A, the input microphone signal from the microphone (XM) facing the environment may alternatively be used, see e.g. dashed arrow (denoted $x_1$) to the cross-correlation unit (XCOR) in FIG. 2B.

If the implementation is easier in a given hearing aid architecture (e.g. an architecture having processing in a transform domain, e.g. the frequency domain, instead of the time domain), the correlation can e.g. be calculated in the frequency domain as the cross spectrum and then be inverse Fourier transformed to obtain the cross-correlation.

The cross spectrum is e.g. defined in chapter 7 of the textbook [Randall; 1987] from which the following is extracted.

The cross spectrum $S_{AB}(f)$ of two complex instantaneous spectra A(f) and B(f), f being frequency, is defined as $$S_{AB}(f)=A^*(f)\cdot B(f),$$

where * denotes complex conjugate (equation (7.1) in [Randall; 1987]).

Applying the Fourier transform and the Convolution theorem, this becomes:

$$F\{R_{ab}(\tau)\}=B(f)A(-f),$$

where $R_{ab}(\tau)$ is the cross-correlation function of the two signals a, b and $\tau$ is the time displacement between them, where A=FFT(a), and B=FFT(b).

$$F\{R_{ab}(\tau)\} = B(f)A*(f), \\ = S_{AB}(f)$$

which is equation (7.26) in [Randall; 1987].

In other words, the cross spectrum is the forward Fourier transform (FFT) of the cross-correlation function $R_{ab}(i)$.

Furthermore, the cross-correlation may be measured in multiple frequency bands and acted upon only in the critical frequency bands. So, the Cross-correlation and Gain Rule bands in FIG. 2 may be multi-channel (provided in the frequency domain), e.g. confined to (narrow) frequency channels below a threshold frequency ($f_{TH}$), e.g. 2.5 kHz.

To avoid comb-filter artefacts, the delayed component should never be the same magnitude AND 180 degrees shifted (i.e. the complex correlation should not take on the value $CC=1\cdot e^{j\pi}$, or Re(CC)=−1, Im(CC)=0). If this occurs, an adaptive algorithm according to the present disclosure is configured to either increase or decrease the gain of the amplifier to avoid the comb-filter artefact. In case the gain is increased, the hearing aid sound is dominating. In case the gain is decreased, the directly propagated sound is dominating (in the full-band signal or in the frequency band in question).

The gain change may be broadband or frequency specific, e.g. based on the best experienced sound quality (e.g. measured according to a criterion, or perceived).

Figure 5:
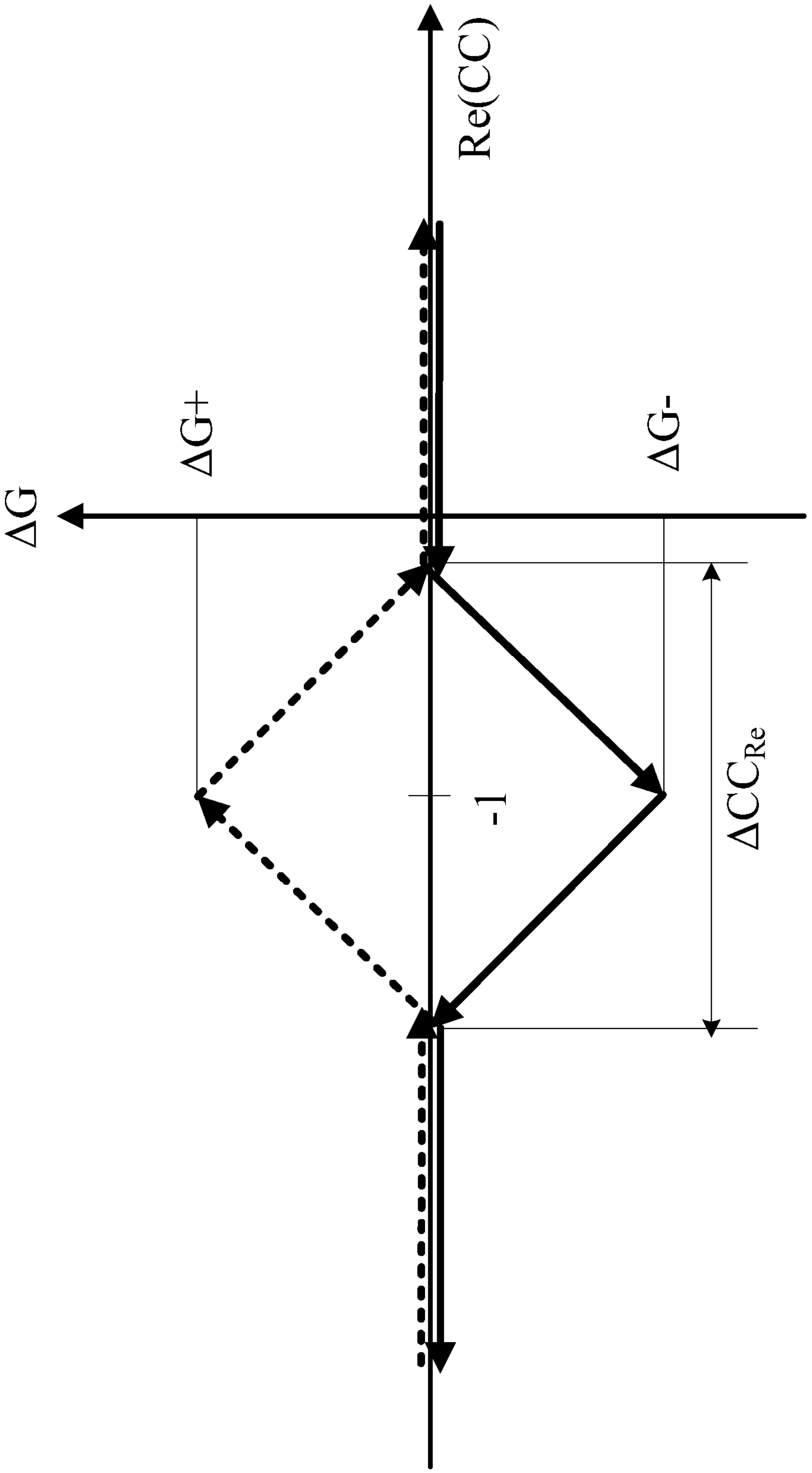
FIG. 5 shows an exemplary gain rule or gain map (change of gain ΔG (e.g. in dB) versus real value of the cross-correlation (Re(CC)) according to the present disclosure to avoid or decrease the comb-filter effect, FIG. 6 schematically shows a BTE/RITE style hearing device according to an embodiment of the present disclosure.

A gain rule or gain map could (as illustrated in FIG. 5) be as follows:

Decreasing gain approaching 1 from above: drop below gain=1 by e.g. switching in a low static gain Increasing gain approaching 1 from below: Switch to higher gain before reaching gain=1.

The present invention has the following advantages over known static solutions:

The actual signal in the ear canal at the actual insertion (possibly including leaks due to non-ideal placement) is used, rather than a fixed, incorrect model of the vent and ear canal. If the ITE-part is a soft, flexible dome, it is also addressed by this adaptive system.

The adaptive algorithm is only affecting the amplified signal when there is a problem and is otherwise non-obtrusive to the amplified signal.

An example of a gain rule is shown in FIG. 5.

FIG. 5 shows an exemplary gain rule or gain map (change of gain $\Delta G$ (e.g. in dB) versus real value of the cross-correlation (Re(CC)) according to the present disclosure to avoid or decrease the comb-filter effect. The gain rule may be applied when the real and imaginary parts of the cross-correlation is within a critical region as illustrated in FIG. 4 (as indicated in FIG. 5 for the real part of the cross-correlation (Re(CC)) by the range $\Delta CC_{Re}$ around (−1,0). The gain rule may be applied to the broadband (time domain) signal or be individual for different frequency bands (e.g. below a threshold frequency ($f_{TH}$)).

The maximum and minimum values ($\Delta G+$, $\Delta G-$, respectively) of the change in gain ($\Delta G$) may e.g. be or the order of 3 dB or 6 dB or more, e.g. 5-10 dB.

The arrows of the two graphs (dashed and solid arrows) indicate an increasing and a decreasing real part of the cross-correlation, respectively, corresponding to an 'increasing gain approaching 1 from below' and a 'decreasing gain approaching 1 from above', respectively.

The increasing or decreasing gain refer to the gain provided by a hearing aid to implement its normal functionality, e.g. compression, noise reduction, etc.

The exemplary gain modifications of FIG. 5 are shown in its simplest possible (symmetric) piecewise linear form. They may of be stepwise, with few or many steps, smoothed curves, be asymmetric, e.g. around (−1, 0), etc.

Figure 6:
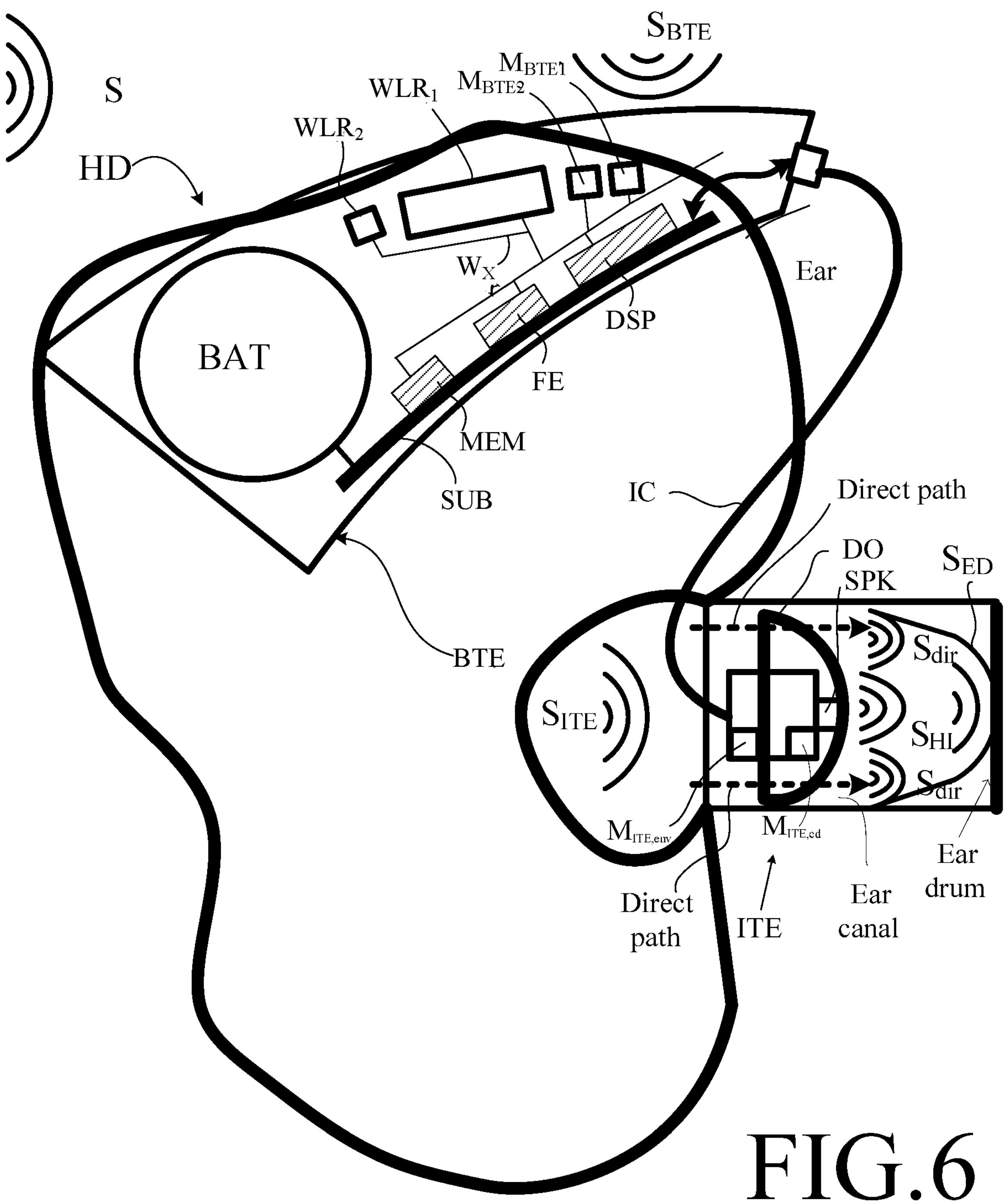

FIG. 6 shows an embodiment of a hearing device (HD) according to the present disclosure. The exemplary hearing device (HD), e.g. a hearing aid, is of a particular style (sometimes termed receiver-in-the ear, or RITE, style) comprising a BTE-part (BTE) adapted for being located at or behind an ear of a user, and an ITE-part (ITE) adapted for being located in or at an ear canal of the user's ear and comprising a receiver (loudspeaker). The BTE-part and the ITE-part are connected (e.g. electrically connected) by a connecting element (IC) and internal wiring in the ITE- and BTE-parts (cf. e.g. wiring Wx in the BTE-part). The connecting element may alternatively be fully or partially constituted by a wireless link between the BTE- and ITE-parts.

In the embodiment of a hearing device in FIG. 6, the BTE part comprises an input unit comprising two (first) input transducers (e.g. microphones) ($M_{BTE1}$, $M_{BTE2}$), each for providing an (first) electric input audio signal representative of an input sound signal ($S_{BTE}$) (originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices, e.g. a remote control or processing device, or a telephone). The hearing device (HD) comprises a substrate (SUB) whereon a number of electronic components are mounted, including a memory (MEM), e.g. storing different hearing aid programs (e.g. parameter settings defining such programs, or parameters of algorithms, e.g. for estimating a modified gain to counteract the comb filter effect according to the present disclosure) and/or hearing aid configurations, e.g. input source combinations ($M_{BTE1}$, $M_{BTE2}$, $M_{ITE,env}$, $M_{ITE,ed}$, $WLR_1$, $WLR_2$), e.g. optimized for a number of different listening situations. In a specific mode of operation, one or more directly received auxiliary electric signals are used together with one or more of the electric input signals from the microphones to provide a beamformed signal provided by applying appropriate complex weights to (at least some of) the respective signals, e.g. to provide an enhanced target signal to the user.

The substrate (SUB) further comprises a configurable signal processor (DSP, e.g. a digital signal processor), e.g. including a processor for applying a frequency and level dependent gain, e.g. providing hearing loss compensation, beamforming, noise reduction, filter bank functionality, and other digital functionality of a hearing device, e.g. implementing a correlation and gain modification unit (e.g. as a gain modification estimator) according to the present disclosure (as e.g. discussed in connection with FIG. 1-5, 7-8). The configurable signal processor (DSP) is adapted to access the memory (MEM) e.g. for selecting appropriate delay parameters and calculate weighting parameters for a gain modification algorithm according to the present disclosure. The configurable signal processor (DSP) is further configured to process one or more of the electric input audio signals and/or one or more of the directly received auxiliary audio input signals, based on a currently selected (activated) hearing aid program/parameter setting (e.g. either automatically selected, e.g. based on one or more sensors, or selected based on inputs from a user interface). The mentioned functional units (as well as other components) may be partitioned in circuits and components according to the application in question (e.g. with a view to size, power consumption, analogue vs. digital processing, acceptable latency, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front-end IC (FE) for interfacing the configurable signal processor (DSP) to the input and output transducers, etc., and typically comprising interfaces between analogue and digital signals (e.g. interfaces to microphones and/or loudspeaker(s)). The input and output transducers may be individual separate components, or integrated (e.g. MEMS-based) with other electronic circuitry.

The hearing device (HD) further comprises an output unit (e.g. an output transducer) providing stimuli perceivable by the user as sound based on a processed audio signal from the processor or a signal derived therefrom. In the embodiment of a hearing device in FIG. 6, the ITE part comprises the output transducer in the form of a loudspeaker (also termed a 'receiver') (SPK) for converting an electric signal to an acoustic (air borne) signal, which (when the hearing device is mounted at an ear of the user) is directed towards the ear drum (Ear drum), where sound signal ($S_{ED}$) is provided. The ITE-part further comprises a guiding element, e.g. a dome, (DO) for guiding and positioning the ITE-part in the ear canal (Ear canal) of the user. The ITE-part further comprises a further (first) input transducer, e.g. a microphone ($M_{ITE,env}$), facing the environment for providing an electric input audio signal representative of an input sound signal ($S_{ITE}$) at the ear canal. The ITE-part further comprises a further (second) input transducer, e.g. a microphone ($M_{ITE,ed}$), facing the eardrum for providing an (second) electric input audio signal representative of sound signal ($S_{ED}=S_{dir}+S_{HI}$) at the eardrum. Propagation of sound ($S_{ITE}$) from the environment to a residual volume at the ear drum via direct acoustic paths through the semi-open dome (DO) are indicated in FIG. 6 by dashed arrows (denoted Direct path). The direct propagated sound (indicated by sound fields $S_a$n) is mixed with sound from the hearing device (HD) (indicated by sound field $S_{HI}$) to a resulting sound field ($S_{ED}$) at the ear drum. The sound output $S_{HI}$ of the hearing device is preferably (at least in a specific mode of operation) configured to be modified in view of the directly propagated sound from the environment to the ear drum as described in connection with FIG. 1-5, so that sound from the environment in the sound output $S_{HI}$ of the hearing device is not cancelled by the directly propagated sound due to the comb filter effect. In the embodiment of FIG. 6, the correlation measure may e.g. be provided between a) the (second) electric input signal (from the microphone ($M_{ITE,ed}$) facing the eardrum (or a signal originating therefrom) AND b1) the output signal provided to the loudspeaker (SPK), OR b2) the (first) electric input signal of the environment facing microphone ($M_{ITE,env}$), or a signal originating therefrom.

The electric input signals (from (first and/or second) input transducers $M_{BTE1}$, $M_{BTE2}$, $M_{ITE,env}$, $M_{ITE,ed}$) may be processed in the time domain or in the (time-) frequency domain (or partly in the time domain and partly in the frequency domain as considered advantageous for the application in question).

The embodiments of a hearing device (HD), e.g. a hearing aid, exemplified in FIGS. 2A, 2B and 6 are portable devices comprising a battery (BAT), e.g. a rechargeable battery, e.g. based on Li-Ion battery technology, e.g. for energizing electronic components of the BTE- and possibly ITE-parts. In an embodiment, the hearing device, e.g. a hearing aid, is adapted to provide a frequency dependent gain and/or a level dependent compression and/or a transposition (with or without frequency compression) of one or more frequency ranges to one or more other frequency ranges, e.g. to compensate for a hearing impairment of a user. The BTE-part may e.g. comprise a connector (e.g. a DAI or USB connector) for connecting a 'shoe' with added functionality (e.g. an FM-shoe or an extra battery, etc.), or a programming device, or a charger, etc., to the hearing device (HD).

Figure 7:
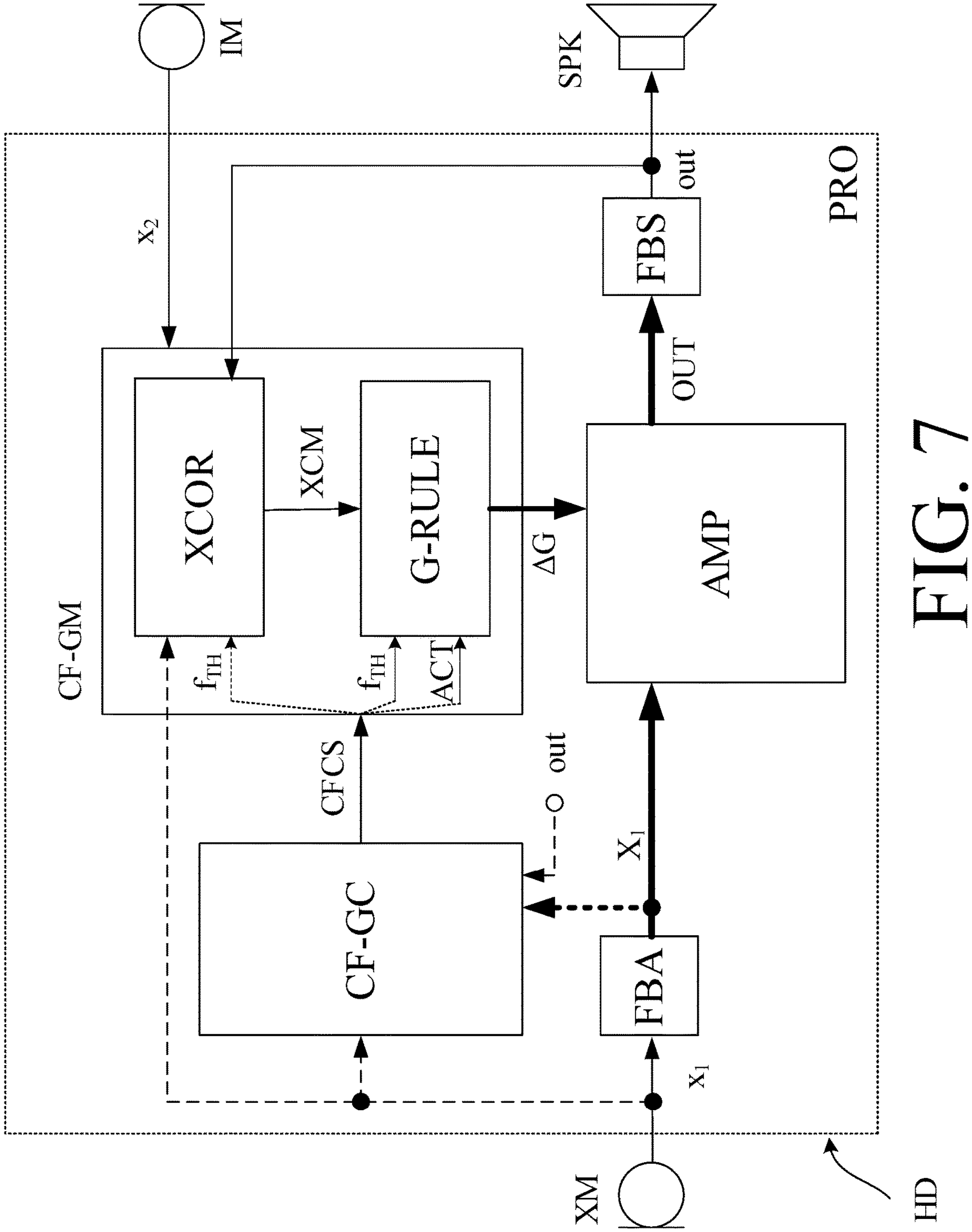
FIG. 7 shows a simplified block diagram of a third embodiment of a hearing device or a part of a hearing device comprising an ITE-part located in an ear canal of the user.

FIG. 7 shows a simplified block diagram of an embodiment of a hearing device (HD), e.g. a hearing aid, or a part of a hearing device. The embodiment is similar to the embodiment of FIG. 2B but contains further details. The hearing aid (HD) is configured to be worn at, and/or in, an ear of a user. The hearing aid comprises an ITE-part adapted for being located at or in an ear canal of the user. The ITE-part comprises a mould or earpiece comprising a ventilation channel or a plurality of ventilation channels, or a dome-like structure (cf. e.g. FIG. 6) comprising one or more openings, allowing an exchange of air with the environment, when the ITE-part is located at or in the ear canal of the user.

The hearing aid comprises a forward path for processing sound from the environment of the user. The forward path comprises at least one first input transducer (hear a microphone (XM)) providing at least one first electric input signal ($x_1$) representing the environment sound as received at the respective at least one first microphone. The at least one first input transducer (XM) is located (e.g. in the mould or earpiece) in such a way to allow it to pick up sound from the environment of the user. The forward path further comprises an audio signal processor (AMP) comprising a gain unit for applying a gain, including a frequency and/or level dependent prescribed gain (e.g. to compensate for a hearing impairment of the user) to the at least one first electric input signal ($X_1$), or a signal or signals originating therefrom, and configured to provide a processed signal (OUT) in dependence thereof. The forward path further comprises an output transducer (here a (miniature) loudspeaker (SPK)) for providing stimuli perceivable as sound to the user in dependence of the processed signal (OUT). The forward path further comprises a filter bank comprising respective analysis and synthesis filter banks (FBA, FBS) allowing processing of the forward path to be performed in the filter bank domain (in frequency sub-bands). The (at least one) analysis filter bank (FBA) is connected to the (at least one) input transducer (XM) and configured to convert the (at least one) electric input signal ($x_1$, in the time-domain) to (at least one) electric input signals ($X_1$) in the time-frequency domain) The synthesis filter bank (FBS) is connected to the output transducer (SPK) and configured to convert the processed (frequency sub-band) signal (OUT) to a time-domain signal (out) that is fed to the output transducer (SPK).

The hearing aid further comprises at least one second input transducer (here a microphone (IM)) providing at least one second electric input signal ($x_2$) representing sound as received at the at least one second input transducer (IM). The at least one second input transducer is located in the ITE-part (e.g. in the mould or earpiece) in such a way to allow it to pick up sound at the eardrum of the user.

The hearing aid further comprises a comb filter effect gain modification estimator (CF-GM), e.g. comprising the gain modifier (G-RULE) of FIG. 2A, 2B, configured to provide a modification gain ($\Delta G$) to said gain unit for application to the at least one first electric input signal ($X_1$), or to a signal originating therefrom, in dependence of a comb filter effect control signal (CFCS) to thereby suppress the comb filter effect in the ear canal. The comb filter effect gain modification estimator (CF-GM) comprises a correlator (XCOR) configured to determine a correlation measure (XCM) between the at least one second electric input signal ($x_2$), or a signal originating therefrom, and a signal of the forward path (e.g. out or $x_1$). The correlator (XCOR) comprises a correlation algorithm, e.g. a cross correlation algorithm. The cross-correlation can be calculated as a real entity, or as a complex entity, so that the phase is also known. The comb filter gain modification estimator (CF-GM) is configured to provide the modification gain ($\Delta G$) in dependence of the correlation measure (XCM) according to a gain rule or gain map (cf. block G-RULE), e.g. as described in connection with FIGS. 4 and 5.

The hearing aid further comprises a comb filter effect gain controller (CF-GC) configured to determine the comb filter effect control signal (CFCS) in dependence of one or more of a) a time delay of the forward path, b) an effective vent size of the ITE-part, c) a sound class signal indicative of a current acoustic environment around the hearing aid, and d) a property of the at least one first electric input signal ($x_1$; $X_1$). The comb filter effect control signal (CFCS) is configured to activate or deactivate the comb filter gain modification estimator (CF-GM), e.g. the gain rule or gain-map block (G-RULE) (cf. activation/deactivation signal ACT) and, if activated, to apply the modification gain ($\Delta G$) only to a critical frequency range below a threshold frequency ($f_{TH}$) expected to be prone to the comb-filter effect. The comb filter effect gain controller (CF-GC) may receive as input signals the at least one electric input signal ($x_1$; $X_1$) and the processed signal (out) or one or more other signals from the forward path and/or from one or more sensors or detectors. An exemplary comb filter effect gain controller (CF-GC) is shown in and described in connection with FIG. 8.

Figure 8:
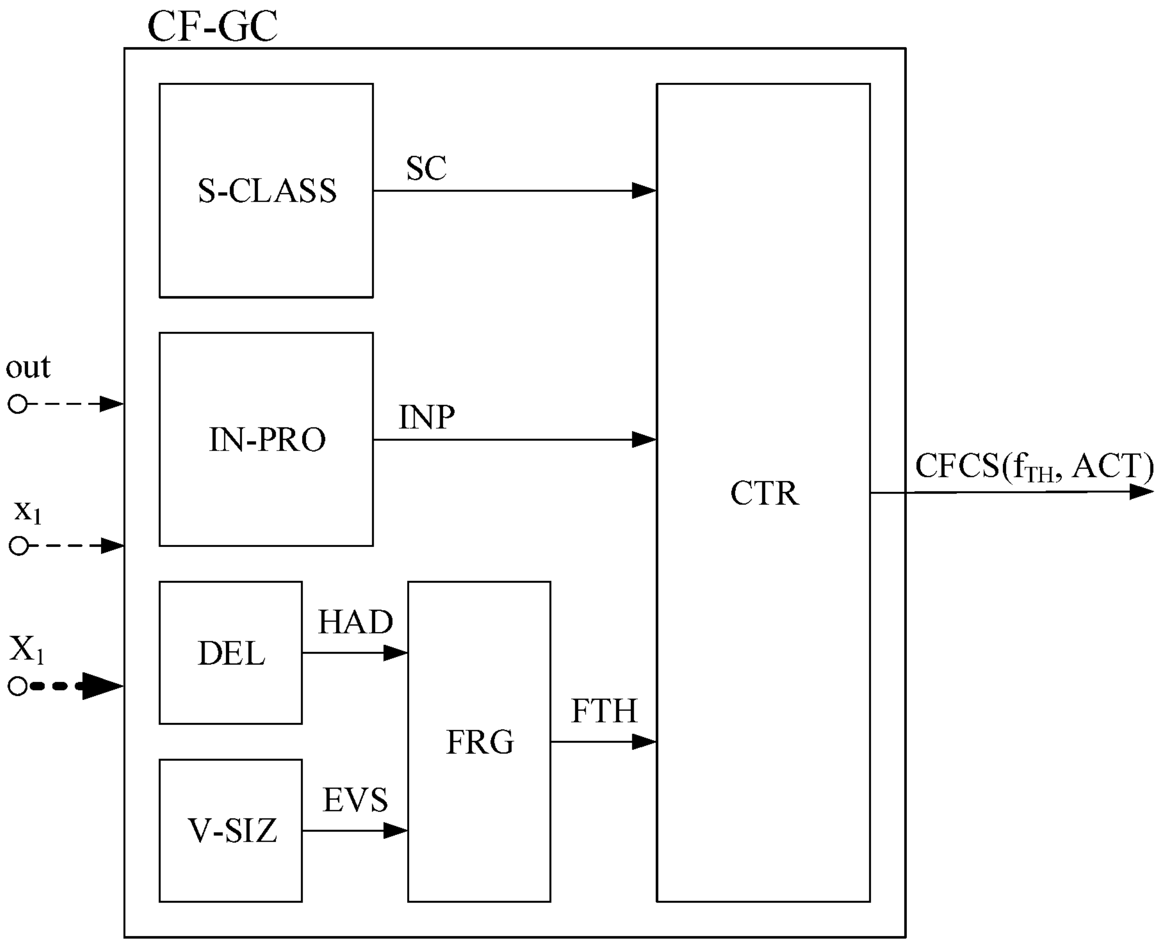
FIG. 8 shows a simplified block diagram of an embodiment of a comb filter effect gain controller according to the present disclosure.

FIG. 8 shows a simplified block diagram of an embodiment of a comb filter effect gain controller (CF-GC) according to the present disclosure.

The effective vent size (EVS) of the ITE-part (e.g. of the mould or earpiece) may be determined in advance of use of the hearing aid, and e.g. stored in memory (cf. block V-SIZ). The effective vent size (EVS) may, however, be adaptively determined during use (cf. block V-SIZ). The effective vent size (EVS) may e.g. be determined during power-on of the hearing aid, when it has been mounted on the user.

The time delay of the forward path of the hearing aid (e.g. the processing delay between the input and output transducers of the forward path) may be determined in advance of use of the hearing aid, and e.g. stored in memory (cf. block DEL). The time delay of the forward path of the hearing aid may, however, be adaptively during use (cf. block DEL), e.g. by comparing the input and output signals ($x_1$, out).

The threshold frequency ($f_{TH}$), below which the hearing aid is considered prone to the comb-filter effect, may be determined in advance of use of the hearing aid and stored in memory (cf. block FRG). The threshold frequency ($f_{TH}$) may, however, be (e.g. adaptively) determined in dependence of the effective vent size (EVS) of the ITE-part and the processing delay of the hearing aid (HAD) (cf. block FRG, and resulting signal (FTH) representing the threshold frequency ($f_{TH}$)). The threshold frequency ($f_{TH}$) may e.g. be in the range between 1.5 kHz and 3 kHz. or adaptively during use.

The comb filter effect gain controller (CF-GC) further comprises an environment classifier (S-CLASS) for classifying a current acoustic environment around the hearing device and providing a sound class signal (SC) in dependence thereof. The environment classifier (S-CLASS) may be configured to classify the current acoustic environment in dependence of the electric input signal(s) ($x_1$, $X_1$), and optionally one or more sensors or detectors.

The comb filter effect gain controller (CF-GC) further comprises an input signal analyzer (IN-PRO) (e.g. forming part of the environment classifier) for determining one or more properties (INP) of the at least one first electric input signal ($x_1$, $X_1$). The one or more properties of the at least one first electric input signal ($x_1$, $X_1$) may e.g. comprise a level of the at least one electric input signal or an indication whether or not the level is above a first minimum level (e.g. in the frequency range below the threshold frequency $f_{TH}$). The first minimum level may e.g. be larger than 20-30 dB SPL. The one or more properties of the at least one first electric input signal ($x_1$, $X_1$) may e.g. comprise a frequency content (e.g. based on power spectral density (Psd)) in the frequency region below the threshold frequency $f_{TH}$, e.g. whether or not the frequency content is larger than a second minimum value.

The comb filter effect gain controller (CF-GC) is configured to determine the comb filter effect control signal (CFCS) in dependence of one or more of the time delay (HAD) of the forward path, the effective vent size (EVS) of the ITE-part, (or alternatively of the threshold frequency $f_{TH}$ (FTH), a sound class signal (SC) indicative of a current acoustic environment around the hearing aid, and a property (INP) of the at least one first electric input signal ($x_1$, $X_1$).

The comb filter effect control signal (CFCS) ($f_{TH}$, ACT) is configured to activate or deactivate the comb filter gain modification estimator (CF-GM) (cf. signal ACT), and, if activated, to apply the modification gain ($\Delta G$) only to a critical frequency range below the threshold frequency ($f_{TH}$) expected to be prone to the comb-filter effect.

Embodiments of the disclosure may e.g. be useful in applications such as hearing aids exhibiting a large inherent delay and comprising an earpiece allowing an exchange of air with the environment.

It is intended that the structural features of the devices described above, either in the detailed description and/or in the claims, may be combined with steps of the method, when appropriately substituted by a corresponding process.

As used, the singular forms “a,” “an,” and “the” are intended to include the plural forms as well (i.e. to have the meaning “at least one”), unless expressly stated otherwise. It will be further understood that the terms “includes,” “comprises,” “including,” and/or “comprising,” when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element, but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method are not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

REFERENCES

[Bramslow; 2010] Bramslow, L. "Preferred signal path delay and high-pass cut-off in open fittings," Int. J. Audiol., 49, pp. 634-44 (2010). DOI:10.3109/14992021003753482.

[Randall; 1987] R. B. Randall, "Frequency Analysis", 3$^{rd}$ edition, September 1987, ISBN 87 87355 07 8, https://www.bksv.com/en/knowledge/blog/sound/frequency-analysis

The invention claimed is:

1. A hearing aid configured to be worn at, and/or in, an ear of a user, the hearing aid comprising an ITE-part adapted for being located at or in an ear canal of the user, wherein said ITE-part comprises a mould or earpiece comprising a ventilation channel or a plurality of ventilation channels, or a dome-like structure comprising one or more openings, allowing an exchange of air with the environment, when said ITE-part is located at or in the ear canal of the user;

a forward path for processing sound from the environment of the user, the forward path comprising at least one first input transducer providing at least one first electric input signal representing said sound as received at the respective at least one first input transducer, said at least one first input transducer being located to allow picking up sound from the environment of the user, an audio signal processor comprising a gain unit for applying a gain, including a frequency and/or level dependent prescribed gain to compensate for a hearing impairment of the user, to said at least one first electric input signal, or a signal or signals originating therefrom, and configured to provide a processed signal in dependence thereof, an output transducer for providing stimuli perceivable as sound to the user in dependence of said processed signal, at least one second input transducer providing at least one second electric input signal representing said sound as received at the at least one second input transducer, the at least one second input transducer being located in said ITE-part to pick up sound at the eardrum of the user, wherein the hearing aid further comprises a comb filter effect gain modification estimator configured to provide a modification gain to said gain unit for application to the at least one first electric input signal, or to a signal originating therefrom, in dependence of a comb filter effect control signal to thereby suppress the comb filter effect in the ear canal, the comb filter effect gain modification estimator comprising a correlator configured to determine a correlation measure between the at least one second electric input signal, or a signal originating therefrom, and a signal of the forward path;

wherein said comb filter gain modification estimator is configured to provide said modification gain in dependence of said correlation measure;

a comb filter effect gain controller configured to determine said comb filter effect control signal in dependence of one or more of a) a time delay of said forward path, b) an effective vent size of the ITE-part, c) a sound class signal indicative of a current acoustic environment around the hearing aid, and d) a property of said at least one first electric input signal;

wherein said comb filter effect control signal is configured to activate or deactivate said comb filter gain modification estimator and, if activated, to apply said modification gain only to a critical frequency range below a threshold frequency expected to be prone to the comb-filter effect.

2. A hearing aid according to claim 1 wherein said correlator is configured to operate in the time-domain.

3. A hearing aid according to claim 1 comprising at least one analysis filter bank configured to provide said at least one electric input signal in the frequency domain in a time-frequency representation (k, l), where k is a frequency band index, k=1, . . . , K, and l is a time index.

4. A hearing aid according to claim 1 wherein the gain modification estimator is configured to operate in a multitude of frequency bands.

5. A hearing aid according to claim 1 wherein said comb filter gain modification estimator is configured to provide said modification according to a gain rule or gain map so that:

said modification gain decreases when approaching a cross-correlation value of −1 from above, and said modification gain increases when approaching a cross-correlation value of −1 from below.

6. A hearing aid according to claim 1 wherein said effective vent size of said ITE-part is determined to correspond to dimensions of a single ventilation channel exhibiting an acoustic impedance equal to said ventilation channel or plurality of ventilation channels or one or more openings through the ITE-part.

7. A hearing aid according to claim 1 wherein said effective vent size of said ITE-part is determined in advance of use of the hearing aid or adaptively during use.

8. A hearing aid according to claim 1 wherein said threshold frequency ($f_{TH}$) is determined in dependence of said effective vent size of the ITE-part and the processing delay of the hearing aid.

9. A hearing aid according to claim 1 wherein said threshold frequency ($f_{TH}$) is in the range between 1.5 kHz and 3 kHz.

10. A hearing aid according to claim 1 wherein said time delay of said forward path of the hearing aid is determined in advance of use of the hearing aid or adaptively during use.

11. A hearing aid according to claim 1 wherein said threshold frequency is determined in advance of use of the hearing aid or adaptively during use.

12. A hearing aid according to claim 1 wherein said signal of the forward path being used to determine said correlation measure is the processed signal.

13. A hearing aid according to claim 1 wherein said correlator and said comb filter effect gain modification estimator are configured to operate in a plurality of frequency bands.

14. A hearing aid according to claim 1 comprising an environment classifier for classifying a current acoustic environment around the hearing aid and providing a sound class signal in dependence thereof.

15. A hearing aid according to claim 1 wherein said comb filter effect control signal is configured to only activate the comb filter gain modification estimator in certain acoustic environments where broadband sound is present or dominating as indicated by said sound class signal.

16. A hearing aid according to claim 1 wherein said comb filter effect control signal is configured to only activate or deactivate said comb filter gain modification estimator when said property of said at least one first electric input signal is above a threshold value in said critical frequency range below said threshold frequency.

17. A method of operating a hearing aid comprising
- an ITE-part adapted for being located at or in an ear canal of the user,
- a forward path from a first input transducer to an output transducer via an audio signal processor,
  - the first input transducer being configured to provide a first electric input signal representative of sound in an environment of the user at the first input transducer,
  - the audio signal processor being configured to apply a prescribed gain to said first electric input signal, or to a signal or signals originating therefrom, to compensate for a hearing impairment of the user, and to provide a processed signal in dependence thereof,
  - the output transducer being configured to provide stimuli perceivable by the user as sound in dependence of said processed signal,
- a second input transducer located in the ITE-part to pick up sound at the eardrum of the user, the second input transducer providing a second electric input signal representing sound as received at the second input transducer;

the method comprising
- determining a time delay of the forward path through the hearing aid from an acoustic input of the input transducer to an acoustic output of the output transducer;
- selecting one or more frequencies or frequency ranges expected to be prone to the comb-filter effect in dependence of said time delay;
- calculating a current value of cross-correlation between said second electric input signal, or a signal originating therefrom, and a signal of the forward path;
- creating a gain rule or gain map for determining a gain modification in dependence of cross-correlation;
- determining a current gain modification in dependence of said current value of the cross-correlation;
- applying said gain modification to said first electric input signal or to a signal originating therefrom.

18. A method according to claim 17 wherein the correlation function is provided in the complex domain as complex values comprising a real and an imaginary part, and wherein a critical region for a given frequency or frequency range selected as being prone to the comb-filter effect is defined in terms of the real and imaginary parts of said complex cross-correlation function.

19. A method according to claim 18 wherein the critical region is around (Re, Im)=(−1, 0) and defined to extend between respective minimum values ($CC_{Re,min}$, $CC_{Im,min}$) and maximum values ($CC_{Re,max}$, $CC_{Im,max}$) on the real axis and the imaginary axis, where the minimum and maximum values of cross-correlation along the real axis are smaller than −1 and larger than −1 respectively ($CC_{Re,min}<-1<CC_{Re,max}$) and where the minimum and maximum values of cross-correlation along the imaginary axis are smaller than 0 and larger than 0 respectively ($CC_{Im,min}<0<(CC_{Im,max})$.

20. A method according to claim 18 wherein said gain rule or gain map is configured to either increase or decrease said current gain modification when said cross-correlation approaches a value of −1 along the real axis to avoid or decrease comb-filter artefacts.

* * * * *